(12) United States Patent
Clarke et al.

(10) Patent No.: US 10,268,982 B2
(45) Date of Patent: Apr. 23, 2019

(54) CARRIER AND SHIPPER INTERFACING AND SHIPMENT TRACKING FRAMEWORK FOR EFFICIENT SCHEDULING AND TRANSPORTATION OF CARGO, WITH SECURITY MONITORING AND EFFICIENT PAYMENT TO CARRIERS

(71) Applicant: OVERHAUL GROUP, INC., Austin, TX (US)

(72) Inventors: Robert Clarke, Austin, TX (US); Ronald Greene, Austin, TX (US); Barry Conlon, Austin, TX (US)

(73) Assignee: Overhaul Group, Inc., Austin, TX (US)

( * ) Notice: Subject to any disclaimer, the term of this patent is extended or adjusted under 35 U.S.C. 154(b) by 512 days.

(21) Appl. No.: 15/156,318

(22) Filed: May 16, 2016

(65) Prior Publication Data
US 2016/0335593 A1    Nov. 17, 2016

Related U.S. Application Data

(60) Provisional application No. 62/162,208, filed on May 15, 2015.

(51) Int. Cl.
*G06Q 10/08* (2012.01)
*G06Q 20/10* (2012.01)

(52) U.S. Cl.
CPC ... *G06Q 10/0833* (2013.01); *G06Q 10/08345* (2013.01); *G06Q 20/102* (2013.01)

(58) Field of Classification Search
CPC ........ G06Q 10/00; G06Q 20/00; G06Q 30/00; G06Q 40/00

USPC ....................................................... 705/3–44
See application file for complete search history.

(56) References Cited

U.S. PATENT DOCUMENTS

| | | | | |
|---|---|---|---|---|
| 7,739,202 B2 * | 6/2010 | Kadaba | ..................... | B07C 3/00 705/338 |
| 7,755,518 B2 * | 7/2010 | Hersh | .............. | G06Q 10/06311 235/384 |
| 7,765,131 B2 * | 7/2010 | Klingenberg | .......... | G06Q 10/08 705/28 |
| 7,792,762 B2 * | 9/2010 | Podgurny | .............. | G06Q 10/08 705/330 |
| 8,166,410 B2 * | 4/2012 | Tadman | ............... | G01C 21/343 701/425 |

(Continued)

*Primary Examiner* — Frantzy Poinvil
(74) *Attorney, Agent, or Firm* — Isidore PLLC

(57) ABSTRACT

A method, system, and computer program product provides efficient matching of shipments with carriers and real time online tracking of shipments. The method includes receiving a carrier input that includes a desired end destination of an equipment of the carrier, and a processor locating at least one available shipment having one of (i) a shipment pick-up point within a pre-established, shipment pick-up zone and (ii) a shipment delivery point within an acceptable shipment drop-off zone of the desired end destination. The processor dynamically determines and maps an optimal route and generates and displays an available shipment (AV) user interface (UI), with a complete route for the equipment from a desired starting point to the desired end destination. The processor then calculates and provides, via the AV UI, an opportunity cost of the shipment, based in part on a total number of empty miles associated with the route.

30 Claims, 23 Drawing Sheets

(56) References Cited

U.S. PATENT DOCUMENTS

| | | | |
|---|---|---|---|
| 2007/0106781 A1* | 5/2007 | Hancock | G06Q 10/06312 709/223 |
| 2008/0183526 A1* | 7/2008 | Hancock | G06Q 10/06312 705/7.22 |
| 2015/0046361 A1* | 2/2015 | Williams | G06Q 10/083 705/330 |
| 2015/0081584 A1* | 3/2015 | Kadaba | B07C 3/00 705/333 |
| 2015/0324741 A1* | 11/2015 | Parry | G06Q 10/0833 705/333 |
| 2018/0053152 A1* | 2/2018 | Chalmers | G06Q 10/08 |

* cited by examiner

300

| Record No. | CARRIER ID | DL NO. | PERSONAL DATA | REGISTRATION DATA | CARRIER VIN | CARRIER TYPE | RATING LEVEL | AWARDS | BASE $/MILE | PAYMENT ACCOUNT | COVERAGE AREA | OTHER |
|---|---|---|---|---|---|---|---|---|---|---|---|---|
| 1 | CARRIER 1 | TX 99996661 | AUSTIN HOME | DATA 1.1 | VIN 1 | FLATBED | TIER 1 | 25 | $ 1.00 | CHASE ACCOUNT | SOUTH USA | DOD CERT |
|   | CARRIER 1 | TX 99996657 | AUSTIN HOME | DATA 1.2 | VIN 6 | REFRIGERATED | TIER 2 | 10 | $ 2.00 | CHASE ACCOUNT | NORTH AMERICA | TRAILER GPS |
| 2 | CARRIER 2 | KY 11667777 | LEXINGTON HOME | DATA 2 | VIN 2 | CONTAINER | TIER 3 | 0 | $ 1.25 | BOA | NORTH AMERICA | 100% COMPLETION RATING |
| 3 | CARRIER 3 | NY 44330044 | BRONX HOME | DATA 3 | VIN 3 | OPEN TOP | TIER 3 | 3 | $ 0.75 | CHASE ACCOUNT | NY-NJ | RECORDED LATE DELIVERY |
| 4 | CARRIER 4 | KS 67580839 | OKC HOME | DATA 4 | VIN 4 | 18 WHLR | TIER 1 | 30 | $ 2.50 | CREDIT UNION | OKC, KS, DALLAS, | 100% COMPLETION RATING |
| 5 | CARRIER 5 | TX 99994527 | DALLAS HOME | DATA 5 | VIN 5 | REFRIGERATED | TIER 2 | 11 | $ 1.75 | PAYPAL | TEXAS, OKC | PERISHABLES, MED SUPPLIES |

| Record No. | SHIPPER ID | SHIPPER TYPE | SHIPPER DATA | REGISTRATION DATA | CARRIER PREFERENCE | RATING PREFERENCE | SHIPPER RATING | BASE $/ MILE | PAYMENT METHOD | DELIVERY DESTINATION | OTHER |
|---|---|---|---|---|---|---|---|---|---|---|---|
| 1 | SHIPPER 1 | PERISHABLES | WACO | DATA 1 | FLATBED | TIER 1 | 25 | $ 1.00 | CHASE EFT | SOUTH USA | |
| 2 | SHIPPER 2 | ALL WEATHER | LEXINGTON HOME | DATA 2 | CONTAINER | TIER 3 | 0 | $ 1.25 | CREDIT CARD | NORTH AMERICA | |
| 3 | SHIPPER 3 | HIGH VALUE | BRONX HOME | DATA 3 | OPEN TOP | TIER 3 | 3 | $ 0.75 | BOA EFT | NY-NJ | |
| 4 | SHIPPER 4 | MEDICAL | OKC HOME | DATA 4 | 18 WHLR | TIER 1 | 30 | $ 2.50 | DEBIT CARD | OKC, KS, DALLAS, | |
| 5 | SHIPPER 5 | GENERAL | DALLAS HOME | DATA 5 | REFRIGERATED | TIER 2 | 11 | $ 1.75 | PAYPAL | TEXAS, OKC | |

| | | | | | R1 |
|---|---|---|---|---|---|
| SHIPPER I 804 | CA RATING 806 | EQPTMNT 808 | TOTAL MILES 810 | EMPTY MILES 812 | PRICE 814 |
| SHIPPER II 804 | CA RATING 806 | EQPTMNT 808 | TOTAL MILES 810 | EMPTY MILES 812 | PRICE 814 R2 |
| SHIPPER III 804 | CA RATING 806 | EQPTMNT 808 | TOTAL MILES 810 | EMPTY MILES 812 | PRICE 814 R3 |

2nd SHIPPER-VIEW UI 800

COUNTER PRICING/RATE 816

REQUEST CONTRACT 820

FIG. 10A

| DESTINATION CITY 1050 | SHIPMENT NO. 1055 | PICK UP ADDR 1060 | SHIPPER 1065 | CARRIER 1070 | ETA 1075 |
|---|---|---|---|---|---|
| Austin, TX | xyxx1 | MMx1 | SHIPP1 | OP2nt | Xi.exe |
| Austin, TX | vhj | MMx2 | SHIPP2*** | OP10*** | X2i.exe |
| Dallas, TX | jkksl | M165 | SHIPP7 | OP_Jack* | Yi.exe |
| Miami, FL | ggg | Rtx123 | SHIPP1** | OPX*# | Zi.exe |
| Los Angeles, CA | 11dd310 | GG123 | SHIPP1 | OP9 # | Ai.exe |

| Road Conditions 1080 | Weather 1085 | Route 1085 |
|---|---|---|
| Cond [1], [2], [5] | [7], [5], [9] | Rte 2 |
| Cond [1], [2], [5] | [3], [10], [6] | Mopac |
| Cond [1], [2], [10] | [8], [7], [8] | I35 |
| Cond [2], [3] | [9], [9] | I10 |
| Cond [3], [10] | [7], [8] | R7,R12,R3 |

FIG. 10B

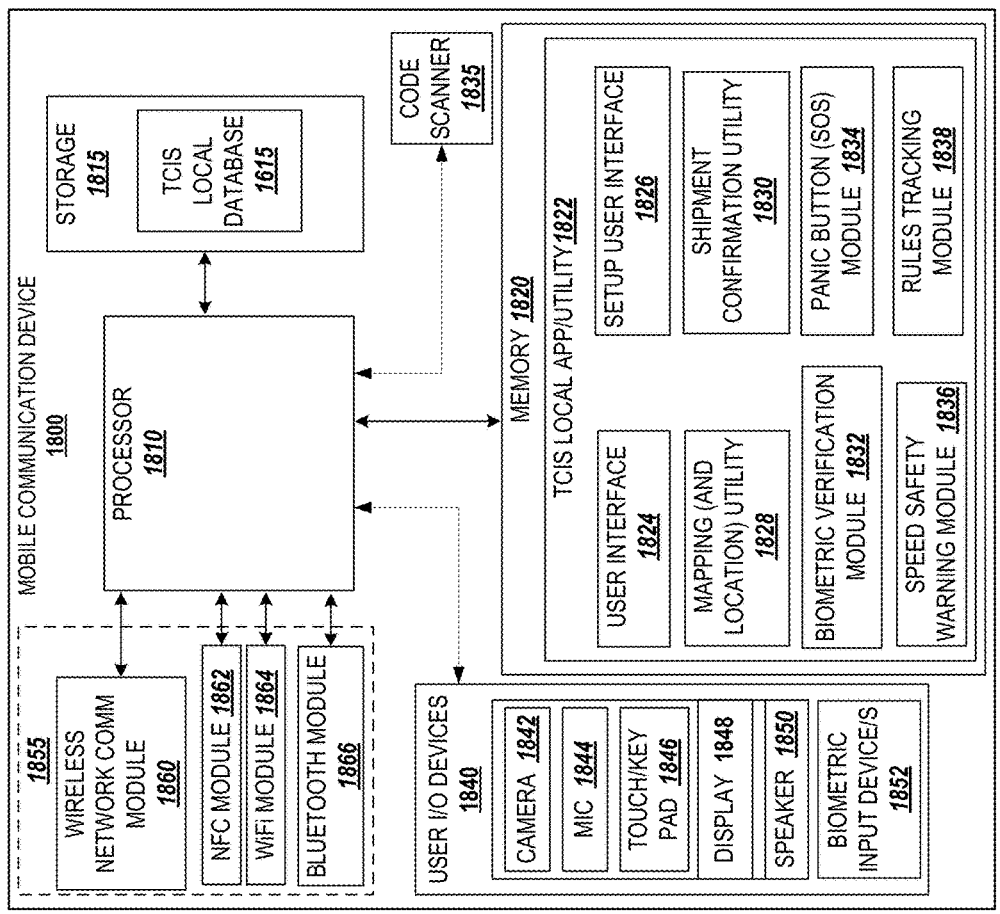
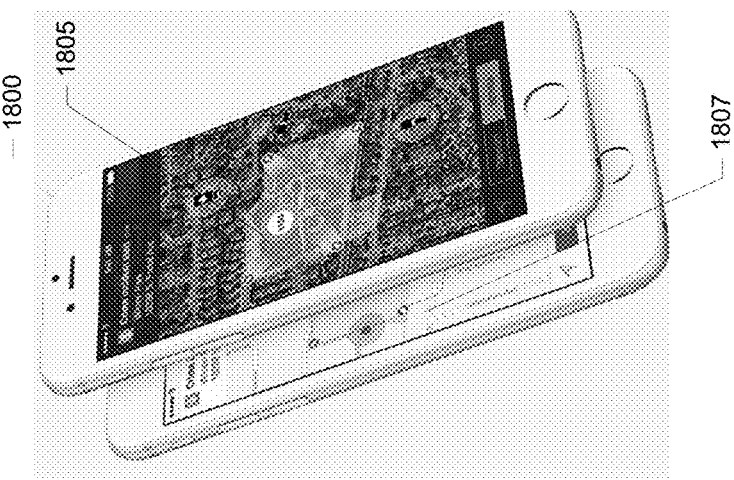
FIG. 18

CARRIER AND SHIPPER INTERFACING AND SHIPMENT TRACKING FRAMEWORK FOR EFFICIENT SCHEDULING AND TRANSPORTATION OF CARGO, WITH SECURITY MONITORING AND EFFICIENT PAYMENT TO CARRIERS

PRIORITY CLAIM

The present disclosure claims priority from U.S. provisional application No. 62/162,208, filed on May 15, 2015, with all content of that provisional application incorporated herein by reference.

BACKGROUND OF THE INVENTION

1. Field of the Invention

The present disclosure is generally related to interactive communication systems and in particular to interactive communication systems utilized to aid owners of goods and/or shippers and carriers to efficiently complete transportation of cargo.

2. Description of the Related Art

Large quantities of goods are transported, as cargo, daily across the continental US and in most other industrial countries with transportation equipments. The trucking industry accounts for a significant portion of the equipments utilized to transport these goods, particularly for medium to large sized items that cannot be easily placed in a small package and shipped using the standard postal service and/or other carriers (e.g., FedEX™ and UPS™). In the trucking industry, goods are arranged to be shipped using brokerage services, involving one or more broker boards and/or individual brokers and agents who coordinate the transportation of cargo by the shippers (i.e., originators of the cargo) and with one or more truckers, trucking companies, and/or a network of trucking companies. The truckers who provide the actual service of moving these shipments are often owner-operated truckers who contract with the broker and/or the trucking company in exchange for a carrier fee set by the brokerage company. The brokers and trucking company in turn add their brokerage fees and/or profit margins on top of the carrier fee and then passes that total fee on to the shipper of the cargo.

Once a trucker (i.e., a driver of a cargo hauling truck) picks up a shipment, the trucker signs for the shipment and proceeds to take the shipment to its intended delivery destination. Very little control is exerted on which routes the trucker takes, and the goods are basically entrusted to the trucker for the duration of the drive, with little or no interaction between the driver/carrier and the shipper, broker, or end customer until the driver finally delivers the shipment to the end customer. A paper receipt is signed or generated and provided to the driver to confirm the delivery of the good. The driver then provides that document to the broker (either on his return to the broker's office or via fax or mail) and waits for the broker to process the delivery confirmation. Once confirmation is established or completed, the broker then pays the driver/carrier via check to his payment address (or in person). This payment typically occurs at the end of an established payment cycle (e.g., monthly or weekly), at some time after the shipment has been completed. The delay in payment processing and other various inefficiencies exist in and have become an accepted component in the current shipping system.

SUMMARY

The illustrative embodiments of the present disclosure provide a method, a system, and a computer program product that enable efficient matching of shipments to equipment carriers and real-time tracking of shipments and interfacing with carriers via use of a carrier and shipper interfacing and shipment tracking (CSIST) framework/portal. The method is computer-implemented and includes: receiving a first input from a carrier that includes at least one of a desired starting point for shipment pickup and a desired end destination of an equipment of the carrier, where the equipment is capable of transporting a shipment from a shipment pick-up point within a first distance of the desired starting point to a shipment delivery point within a second distance of the desired end destination. When only a desired end destination is entered, the method further includes identifying a current location of the equipment, based on one of the received first input and received location data that is dynamically detected from a location tracking device associated with one of a communication device of the driver and the equipment. A processor, which enables implementation of the CSIST framework, locates at least one available shipment having at least one of (i) a shipment pick-up point within a pre-established, shipment pick-up zone corresponding to an acceptable radius around the desired starting point (or the current location, when no desired starting point is identified) and (ii) a shipment delivery point within an acceptable shipment drop-off zone of the desired end destination. The shipment pick-up point can be a different location from the desired starting point and the current location of the equipment, and the shipment delivery point can be a different location from the desired end destination for the equipment. The method also includes: the processor dynamically determining and mapping an optimal route for delivery of each of the at least one available shipment from a respective, corresponding shipment pick-up point to a respective, corresponding shipment delivery point. The processor generates and displays an available shipments (AV) user interface (UI), and plots, on the AV UI, a complete route for the equipment from the desired starting point or current location to the desired end destination. The route includes a first path from the desired starting point or current location to the shipment pick-up point, at least one middle path including the optimal route for the corresponding shipment, and a third path from the shipment delivery point to the desired end destination. The method then includes calculating and providing, to the carrier, via the AV UI, an opportunity cost of the shipment along that complete route. The opportunity cost is calculated, in part based on a total number of empty miles associated with at least one of the first path and the second path.

According to another aspect of the disclosure, a computer program product is provided that includes a computer readable storage medium. Stored on the computer readable medium is program code for an CSIST framework. The program code is executable by a processor on a computing system having a network interface device (NID) for communicating with remotely-connected user devices utilized by one or more shippers and one or more carriers. The processor is communicatively coupled to the NID and to the CSIST database. When executed by the processor, the program code configures the computing device to perform the above method features and additional features of the disclosure.

According to yet another embodiment, the system facilitates shipment of cargo, and includes: at least one storage having stored thereon a plurality of CSIST modules and CSIST data that collectively provides an CSIST framework; and a network interface mechanism (NIM) that operates to enable communication and data exchange between the system and a plurality of second and third devices of the shipper and/or the carriers that connect to the system via the NIM. The system also includes: at least one processor that is communicatively coupled to the NIM and to the at least one storage. The processor executes the plurality of CSIST modules, and configures the system to: generate a first user interface providing a map capable of identifying a cargo pick-up point; and in response to receiving a request from a registered carrier for assignment of a cargo, the carrier having at least one equipment: identify one of a current location of the equipment and a desired starting point of the equipment; receive an indication of a desired end destination for the equipment; determine whether any shipment is available within a particular radius of the current location or the desired starting point and being routed to a delivery point within a next radius of the desired end point; in response to identifying an available shipment, verify that the carrier is an authorized carrier for assigning the available shipment. The processor execution of the CSIST modules further configures the system to: in response to the carrier being verified as an authorized carrier for that shipment, generate a route that originates from an applicable one of the current location and the desired starting point of the equipment, and proceeds along a first path to the shipment/cargo pick-up point, a second path to the delivery point, and a third path to the desired end point; and present the route to the carrier along with a notification that indicates a relative opportunity cost of the shipment based on a total distance of the first path and the third path.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 3 and 4 illustrates example tables of personal and other data corresponding respectively to registered carriers and registered shippers within the CSIST database and utilized within the CSIST framework, according to a plurality of embodiments;

FIG. 7 illustrates a second carrier-view UI showing a listing view of available shipments for possible selection by the carrier, according to one or more embodiments;

FIG. 8 illustrates a second shipper-view UI showing a listing view of available carriers and corresponding relevant data utilized to facilitate shipper selection of specific carriers and/or equipment for transporting specific shipments, in accordance with one or more embodiments;

FIGS. 10A-10B present a graphical view and a block table view of an example listing of in-route shipments generated based on the information illustrated within the GUI of FIG. 9;

FIG. 18 illustrates an example mobile communication (MC) device of a driver, complete with functional components and features that provide a user interface that enables access to and communication with the TCIS and CSIST framework by the carrier/driver, according to one embodiment.

DETAILED DESCRIPTION OF ILLUSTRATIVE EMBODIMENTS

Figure 1:
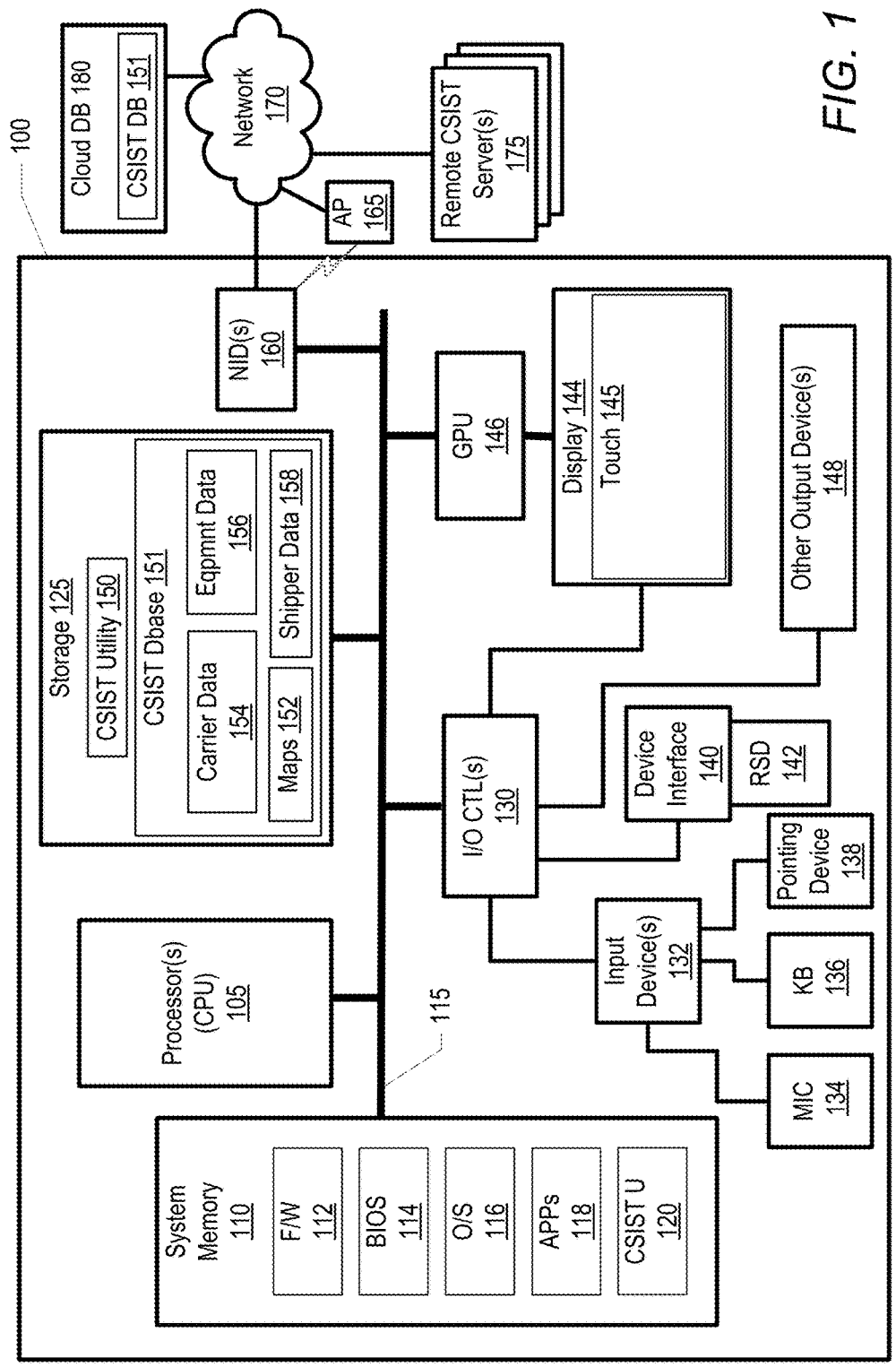
FIG. 1 illustrates an example data processing system that operates as a networked computing device and/or server providing the cloud infrastructure supporting implementation of a carrier and shipper interfacing and shipment tracking (CSIST) framework, according to one or more embodiments.

The illustrative embodiments of the present disclosure provide a method, a system, and a computer program product that enable efficient matching of shipments to carriers and real-time tracking of shipments and interfacing with carriers via use of a carrier and shipper interfacing and shipment tracking (CSIST) framework/portal. According to one embodiment, the carrier can be a trucker ((i.e., a driver of a cargo hauling truck) and the shipper can be anyone who has cargo or packages that require pickup and transportation to a delivery destination.

The claimed features generally includes a method, system, and computer program product that provide (i) efficient matching of shipments with carriers and carrier equipment and (ii) real time online tracking of shipments. The method includes receiving a carrier input that includes at least one of a desired starting point and a desired end destination of an equipment of the carrier, and a processor locating at least one available shipment having one or both of (i) a shipment pick-up point within a pre-established, shipment pick-up zone of the desired starting point and (ii) a shipment delivery point within an acceptable shipment drop-off zone of the desired end destination. The processor dynamically determines and maps an optimal route and generates and displays an available shipment (AV) user interface (UI), with a complete route for the equipment from the desired starting point (or current location of the equipment, when only a desired end point has been entered, i.e., no desired starting point has been entered) to the desired end destination. The processor then calculates and provides, via the AV UI, an opportunity cost of the shipment, based in part on a total number of empty miles associated with the route.

As described in greater details and presented in separate sub-sections of the detailed description, aspects of the disclosure further provides for carrier verification, tracking of products, shipper options to select types of equipments, routes of travel, and timing for delivery, etc. Other aspects provide for faster, more efficient reporting by carriers along the route up to and including completion of delivery, and quicker payment to the carriers following completion of the delivery, among other features.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Within the description of the features of the disclosure and the accompanying drawings, the embodiments are presented from the perspective of a trucking based shipping model, where the term "carriers" is provided to refer to (i) an owner-operator with a single equipment, (ii) an owner-operator or small business owner with several trucks, and who can employ multiple drivers, and (iii) a large commercial organization/company that includes a large number of trucks, e.g., hundreds of trucks and drivers. Additionally, the term "equipment" generally refers to the combination of "tractor and trailer", and covers the various different types of equipment available, including, but not limited to, flatbeds, dry vans, refrigerated trucks, etc. According to one embodiment, the relevant details of the equipment that is tracked includes the type of equipment as well as the available capacity of the specific equipment to load additional cargo. It is appreciated that, while specific types of cargo hauling trucks fall within the term equipment, the term equipment can also apply to different types of trucks or motor vehicles, without limitation. Additionally, the underlying features of the disclosure are fully applicable to other transportation and/shipping spaces, such as water-based shipping (e.g., ocean cargo or river cargo), where carriers are boat owners carriers or cargo ship captains, the equipments are the water vessels or amphibious vessels, and the shippers can be any registered person or business that has a cargo that can be transported over water from a cargo pick-up point to a delivery destination by a carrier. Air based transportation is also a supported space that can include an CSIST framework designed for interfacing by air-based cargo shippers and pilots with planes, etc. It is further foreseeable that the functionality of an CSIST framework can be extended to a transportation space involving drone shipments, for example, where the drone operators (pilots) are not co-located with the drone equipments.

For simplicity and to present best mode embodiments, the disclosure is described from the perspective of a trucking industry, where the carrier is a trucker and the equipment is a truck (on-land motor vehicles), It is appreciated that various aspects of the disclosure can be extended to and/or are applicable to other forms of carriers and corresponding equipment, such as aircrafts and aircraft pilots and water-based equipments and their captains/owners. Also, the use of "trucks" as the equipments presented herein are intended to convey a single example of on-land motor equipments. It is understood that the features and functionality described herein can also be applicable to smaller on-land motorized equipments, such as cars, RVs, busses, motorcycles, and the like, without limitation. Extension to bicycles and other non-motorized form of transportation can also be applicable.

Those of ordinary skill in the art will appreciate that the hardware, firmware/software utility, and software components and basic configuration thereof depicted in the following figures may vary. For example, the illustrative components of data processing system 100 (FIG. 1) and mobile communication (MC) device 1800 (FIG. 18) are not intended to be exhaustive, but rather are representative to highlight some of the components that are utilized to implement certain of the described embodiments. For example, different configurations of either computer device 100 or MC device 1800 may be provided, containing other devices/components, which may be used in addition to or in place of the hardware depicted, and may be differently configured. The depicted examples are therefore not meant to imply architectural or other limitations with respect to the presently described embodiments and/or the general invention.

Referring now to the figures, and beginning with FIG. 1, there is illustrated a block diagram representation of an example data processing system (DPS) that operates as a networked computing device and/or server providing the cloud infrastructure supporting implementation of a carrier and shipper interfacing and shipment tracking (CSIST) framework, according to one or more embodiments. DPS 100 operates as the computing device within which one or more of the described features of the various embodiments of the disclosure can be implemented. In one embodiment, DPS 100 can be any electronic device such as, but not limited to, a desktop computer, notebook computer, or a server. In one embodiment, DPS 100 can be one sever within a cluster of servers, where the servers can be in co-located in a single location or geographically dispersed over a plurality of locations, or a combination thereof. Additionally, in one embodiment, DPS 100 can be implemented as a virtual machine sharing hardware resources of a physical server.

Example DPS 100 includes at least one processor or central processing unit (CPU) 105 coupled to system memory 110, non-volatile storage 125, and input/output (I/O) controllers 130 via system interconnect 115. System interconnect 115 can be interchangeably referred to as a system bus, in one or more embodiments. One or more software and/or firmware modules can be loaded into system memory 110 (from storage 125 or other source) during operation of DPS 100. Specifically, in the illustrative embodiment, system memory 110 is shown having therein a plurality of common modules, including firmware (F/W) 112, basic input/output system (BIOS) 114, operating system (OS) 116, and application(s) 118. Additionally, system memory 110 includes CSIST utility 120. CSIST utility 120 can be provided as one of applications 118 and/or as an executable component within F/W 112 or OS 116, in alternate embodiments. The software and/or firmware modules within system memory 110 provide varying functionality when their corresponding program code is executed by CPU 105 or by secondary processing devices (not specifically shown) within DPS 100.

I/O controllers 130 support connection by and processing of signals from one or more connected input device(s) 132, of which microphone 134, keyboard 136, and pointing device 138 are illustrated, by way of example. Pointing/Touch device 138 can be a mouse or a touch pad, or stylus, for example. It is appreciated that input devices can also include, as a non-exclusive list, hardware button(s), touch screen 145, infrared (IR) sensor, fingerprint scanner, and the like. I/O controllers 130 also support connection with and forwarding of output signals to one or more connected output devices, including display 144 and other output devices 148. Display 144 can include a touch screen 145 that serves as a tactile input device. In one embodiment, DPS 100 also includes a graphics processing unit (GPU) 146, which is communicatively or physically coupled to Display 144 and to processor 105. GPU 146 controls the generation and presentation of certain user interfaces (UIs) that are created during execution of CSIST utility 120 by CPU 105.

Additionally, in one or more embodiments, one or more device interfaces 140, such as an optical reader, a universal serial bus (USB), a card reader, Personal Computer Memory Card International Association (PCMIA) slot, and/or a high-definition multimedia interface (HDMI), can be associated with DPS 100. Device interface(s) 140 can be utilized to enable data to be read from or stored to corresponding removable storage device(s) (RSD) 142, such as a compact disk (CD), digital video disk (DVD), flash drive, or flash memory card. In one or more embodiments, device interfaces 140 can further include General Purpose I/O interfaces, such as Inter-Integrated Circuit ($I^2C$), System Management Bus (SMBus), and peripheral component interconnect (PCI) buses. In accordance with one embodiment, the functional modules described herein as aspects of the disclosure can be provided as a computer program product. The computer program product includes removable storage device(s) 142 as a computer readable storage medium, on which is stored program code when executed by a processor causes the processor to implement the various functions described herein, including, but not limited to, the features presented in the flow charts of FIGS. 9-11.

DPS 100 further includes network interface device (NID) 160, which can include both wired and wireless networking devices (not specifically shown). NID 160 enables DPS 100 and/or components within DPS 100 to communicate and/or interface with other devices, services, and components that are located external to DPS 100. In one embodiment, DPS 100 may directly connect to one or more of these external devices, via NID 160, such as via a direct wire or wireless connection. In one or more embodiments, DPS 100 connects to specific external devices, services, and/or components, such as information server(s) 175 and Cloud database 180, via external network 170, using one or more communication protocols. Network 170 can be a local area network, wide area network, personal area network, and the like, and the connection to and/or between network 170 and DPS 100 can be wired or wireless (via access point 165) or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet. In one embodiment, CSIST framework is accessible via the Internet (170) as a website having one or more domain names affiliated therewith.

As one aspect of the disclosure, CSIST utility 120 includes a plurality of functional modules that execute on CPU 105 to perform specific functions, and these functional modules utilize and/or generate specific data, which data is stored as information and/or data within storage 125 and/or within cloud database 180. As an example, storage 125 is shown to include CSIST Database 151, which includes different blocks of data, including Maps 152, carrier data 154, Equipment data 156, and Shipper data 158. Also, cloud database 180 is shown to include a copy of CSIST database 151. Both CSIST databases 151 store relevant data utilized by CSIST utility 120 to perform the personalization of certain UIs and locating of trucks and/or shipments on a displayed map. Access to the CSIST DB 151 at remote, cloud DB 180 is can be provided via the connection through network 170.

Figure 2:
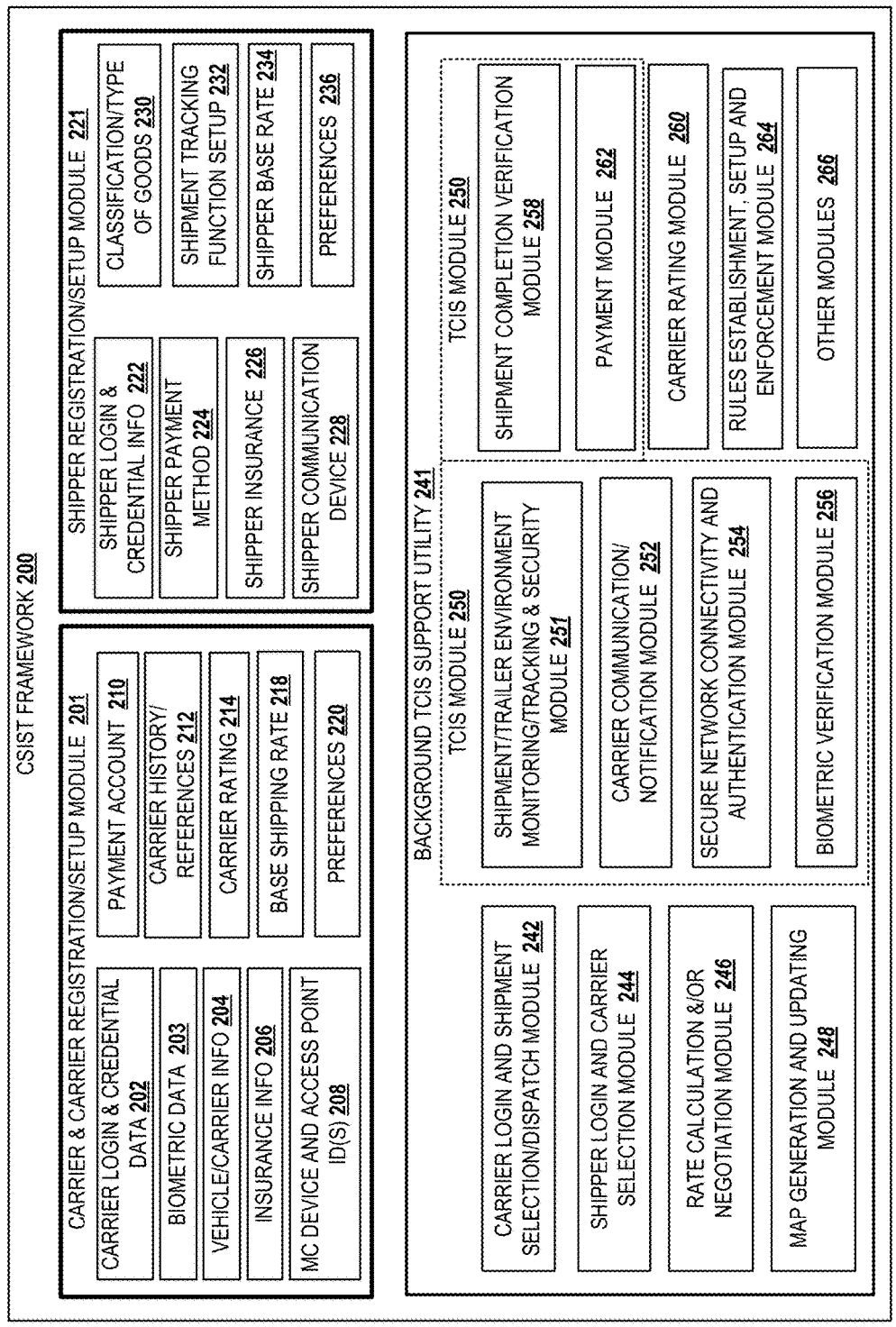
FIG. 2 is a block diagram representation of several of the functional modules that make up the CSIST server and which support specific functional aspects of the disclosure, according to one or more embodiments.

FIG. 2 is a block diagram representation of several of the functional modules that make up the CSIST framework 200. As presented herein, CSIST framework 200 is generally a software and firmware construct provided by processor execution of CSIST utility 120 on DPS 100, and which implements specific functional aspects of the disclosure, according to one or more embodiments.

CSIST framework 200 includes carrier and equipment registration/setup (CERS) module 201 and shipper setup module 221. Additionally, CSIST framework 200 includes background CSIST framework utility 241, which includes a plurality of additional functional modules. Collectively, the various functional modules within CSIST framework provide each of the various functions described herein when a particular one of the modules is executed by processor 105. In some embodiments, multiple of these modules operate concurrently to provide or support a specific function. OCRS module 201 is executed within framework 200 to allow a carrier to register with the framework and also to input a series of relevant data that is required to establish the carrier account, and any required and/or necessary information about the equipment. Included within the data that is collected from the carrier via the OCRS module 201 and stored within CSIST database 150 are carrier login and credential data 202, biometric data 203, equipment information 204, insurance information 206, and MC device and access point IDs 208. Additionally, OCRS module 201 includes payment account 210, carrier history/preferences 212, carrier rating 214, base shipping rate 218, and preferences 220. Carrier login and credential data is required for the carrier to gain access to a personalized user interface (UI) by which the carrier is able to view available shipments, request selection for one or more of those available shipments, interface with a shipper, and/or update information within the carrier's profile maintained within the framework 200. The equipment information 204 identifies one or more equipment that the carrier can utilize to transport shipments that are assigned to the carrier.

Referring to FIG. 3, there is illustrated an example carrier table 300 maintained within CSIST database, containing a plurality (5) different carrier entries, in accordance with one or more embodiments. Each entry within stored carrier table 300 corresponds to a registered carrier of at least one equipment. As shown by FIG. 3, and according to one embodiment, a carrier (carrier 1) can have more than one equipment (equipment 1.1 and equipment 1.2) assigned to the carrier's profile. Additionally, for larger carriers, the single carrier profile may also include additional drivers (illustrated using different driver's license) and personal information corresponding to each of the specific drivers that drive for the particular carrier. Hence, the term "carrier" as utilize within the disclosure is not intended to imply a single person or the individual that is actually driving the equipment, but can refer to a large company having hundreds of equipment and drivers, in one or more embodiments.

Each carrier sets up a payment account 210 by which the carrier is able to receive payment at the completion of each shipment. As illustrated, payment can be via electronic deposit or electronic funds transfer (EFT) directly into the carrier's payment account 210. Additionally, each carrier can specify a base shipping rate 218 and additional preferences 220. In one embodiment, the base shipping rate is established by the framework 200 at the time the carrier first registers with the framework. In another related embodiment, the base shipping rate 218 can be associated with the carrier rating 214. The carrier rating 214 can be associated with a number of awards, where each award represents a completed shipment. In certain scenarios, such as the successful completion of a high value or high priority shipment, for example, the framework can provide more than a single award for completion of the shipment, thus allowing the carrier to attain the next higher rating level at a faster pace. In one embodiment, the base shipping rate 218 can then be modified following completion of several shipments and attainment by the carrier of a next higher rating. A driving record and or history of the carrier 212 is also maintained for access by one or more shippers and/or for general evaluation by the framework 200.

In FIG. 2, shipper registration/setup (SRS) module 221 also provides the initial setup user interface that allows a shipper to become registered with the framework 200. Registration with the framework enables the shipper to receive access to a personalized shipper view UI. Access to the personalized shipper view is gained via entry of shipper login and credential information 222, which is stored within CSIST database. Additional data and information is also maintained and periodically updated by SRS module 221. Among the additional data are shipper payment method 224, shipper insurance 226, shipper communication device 228, classification/type of goods to 30, shipment tracking function setup 232, shipper base rate 234 and shipper preferences 236. FIG. 4 illustrates a shipper table 400 providing a plurality of entries each associated with a profile of one of the registered shippers, according to one embodiment. Shipper payment method 224 can be a credit card or bank account or PayPal account that is established by the shipper to pay for shipments that are completed by a registered carrier of the framework 200. Classification/type of goods 230 enables shipper to specify information about the goods and/or cargo that the shipper is providing for shipment. As an example, a shipper may be shipping refrigerated goods that require a specialized truck with refrigeration. Alternatively, as another example the specific goods may be high valued goods, wherein the shipper desires only very highly rated carriers to be selected for transport in those goods. Shipper base rate 234 presents a default rate that the shipper may establish to pay for shipments. It is appreciated that this base rate can also be established by the framework 200, and/or that the base rate is a variable rate depending on a type of shipment and one or more other factors, such as a distance of travel. In an alternate embodiment, as described herein, the rate for each shipment can be negotiated between the shipper and a selected carrier. The base rate 234 can then be an initial rate that is presented along with the shipment on the carrier-view UI. Preferences 236 represent additional shipper defined preferences related to the carriers that can be selected for handling the shipper's cargo and/or the types of equipments that can be selected for the cargo, etc. According to one embodiment, a shipper engages in a selection process for identifying and selecting a best equipment and carrier for a particular shipment based on data within the carrier profiles (FIG. 3), such as carrier rating level and carrier base shipping rate 218, and other received external inputs, including travel conditions, shipment delivery destination, and others.

Additional functional modules 241 of framework 200 includes carrier login and shipment selection/dispatch module 242, shipper login and carrier selection module 244, rate calculation and/or negotiation module 246, map generation and updating module 248. Functional modules 241 also includes shipment/trailer environment monitoring/tracking and security module 250, carrier communication/notification module 252, secure network connectivity and authentication module 254, and biometric verification module 256. Functional modules 241 also includes shipment completion verification module 258 carrier rating module 260, payment module 262, rules establishment, setup, and enforcement module 264, and other modules 266. Carrier login module 242 enables carriers to log into their personal carrier-view UI on framework 200, and to then interface with framework 200 to identify and select shipments based on inputs provided by the carrier. Similarly shipper login module 244 enables shippers to log into their personal shipper-view UI on framework 200, and to then interface with framework 200 to identify and select carriers to assign the shipments to, based on inputs provided by the shipper and the available carriers. Recalculation and/or negotiation module 246 allows a shipper and a carrier to engage in an online negotiation of rates for particular shipment that is presented on the carrier-view UI. Map generation and updating module 248 enables generation of geographical road maps with a variety of different shipping views to facilitate carrier selection of shipments and/or facilitate shipper selection of carriers.

Carrier (Trucker) communication interface system (TCIS) module 250 represents a group of modules that interface with a general TCIS and provides specific features and functionality associated with the equipment and driver remotely from the CSIST framework. While shown within TCIS module 250 these sub-modules and their associated functionality are described as generally existing within CSIST framework 200. Shipment/trailer environment monitoring/tracking and security module 251, communicates with one or more sensors co-located with the trailer and or shipment to provide real-time feedback on a location of a shipment and/or the equipment of that shipment. This information is fed back to the map generation and updating module 248 to update the location of the equipment/shipment on the displayed geographic roadmap. Carrier communication notification module 252 provides a series of mechanisms by which notifications and other forms of communication can be sent directly to an MC device of the carrier/driver.

Shipment completion verification module 258 receives confirmation from one or more sources to verify that a shipment has been completed, i.e., that delivery of the cargo has been made at the delivery destination and received by the intended recipient. Payment module 262 performs a function of receiving payment from the shipper and, once verification of the shipment completion is made, forwarding that payment to the carrier account. In one or more embodiments, payment module can be configured to issue partial payments based on completion of certain parts of the delivery by the carrier. In this embodiment, the final payment of a balance remaining from the contracted total and any bonuses and/or tips approved for the driver/carrier are provided at the completion of the shipment. Carrier rating module 260 provides a mechanism by which the carriers are linked to specific rating levels and can be moved up to a higher-rated level or demoted down to a lower rating level based on the carrier's actual performance in his assigned shipments. A reward mechanism is established by the framework 200 to enable tracking of the carrier's performance, and certain thresholds are established at which the carrier can be promoted to a higher rating level. As a part of the determination of whether a carrier successfully completed the shipment and is deserving of an award for that shipment, rules establishment and enforcement module 264 provides a series of rules that the carrier is required to follow when picking up a shipment and delivering the shipment to its intended destination. These rules are provided to the carrier at the time the shipment is assigned, prior to the carrier picking up the shipment. According to one embodiment included in these rules is a red zone enforcement policy that requires the carrier to drive a minimum number of miles (example 200 miles) without stopping once a shipment is picked up. In one or more embodiments, rules set up and enforcement module 264 is able to push a notification to a MC device of the carrier/driver indicating when a rule is not being followed. The carrier is then provided some time to correct his/her actions and abide by the rule. Failure of the carrier to follow the rule can result in removal of an award or other negative consequences that affects the carriers overall rating level and/or profile. Framework 200 includes additional modules 266, which modules can be modified as needed to provide additional functionality within framework 200.

Generally, the above description of DPS 100 and CSIST framework 200 provides a system (100/200) for facilitating shipment of cargo. For simplicity, the system is assumed to be synonymous with or implementable as DPS 100. The system includes at least one storage 125 having stored thereon a plurality of processor-executable carrier and shipper interfacing and shipment tracking (CSIST) modules and CSIST data that collectively provides a CSIST framework 200. The system also includes a network interface mechanism/device (NID) 160 that operates to enable communication and data exchange between the system and a plurality of second and third devices of the shipper and/or the carriers that connect to the system via the NID 160 and a network 170. The system 100 includes at least one processor 105 that is communicatively coupled to the NIM and to the at least one storage.

The processor 105 executes the plurality of CSIST modules, which configures the system to: generate a first user interface providing a map capable of identifying a cargo pick-up point. Then, in response to receiving a request from a carrier of a registered equipment for assignment of a cargo, where the request originates from a carrier of equipment, the system identifies one of (i) a desired starting point (when one is provided) and (ii) a current location of the equipment and determines whether any shipment is available within a particular radius of the desired starting point or current location. Then, in response to identifying an available shipment, the system verifies that the carrier is an authorized carrier for assigning the available shipment. In response to the carrier being verified as an authorized carrier for that shipment, the system generates a route that originates from the current location of the carrier, and proceeds along a first path to the shipment/cargo pick-up point, a second path to the delivery point, and a third path to the desired end point. The system then presents the route to the carrier along with a notification that indicates a relative opportunity cost of the shipment based on a total distance of the first path and the third path.

Figure 6:
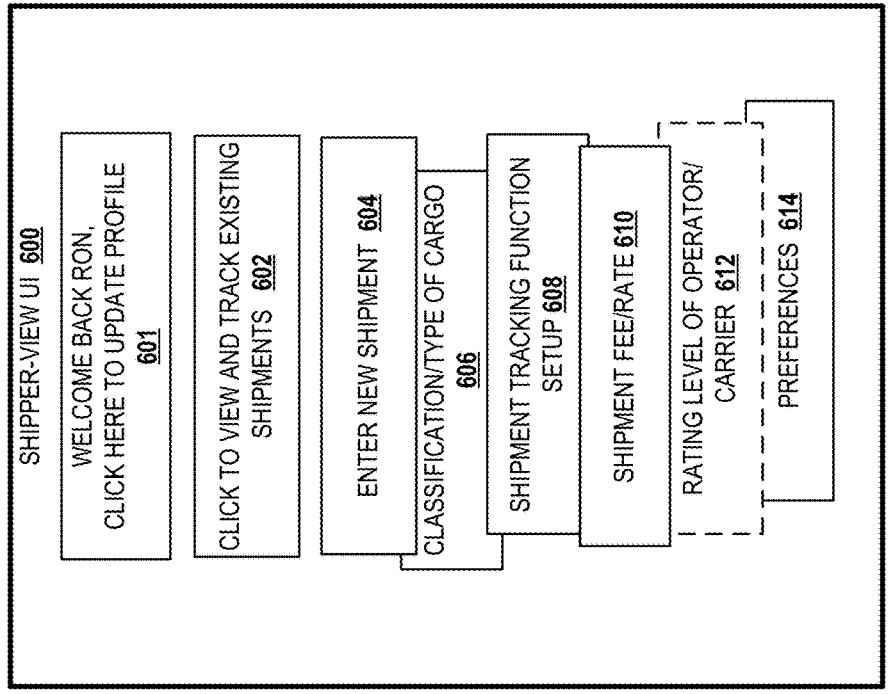
FIGS. 5 and 6 provides block diagram representations of examples of a carrier-view user interface (UI) and a shipper-view UI, respectively, which are presented via the CSIST framework on login to the framework, according to a plurality of embodiments.
Figure 5:
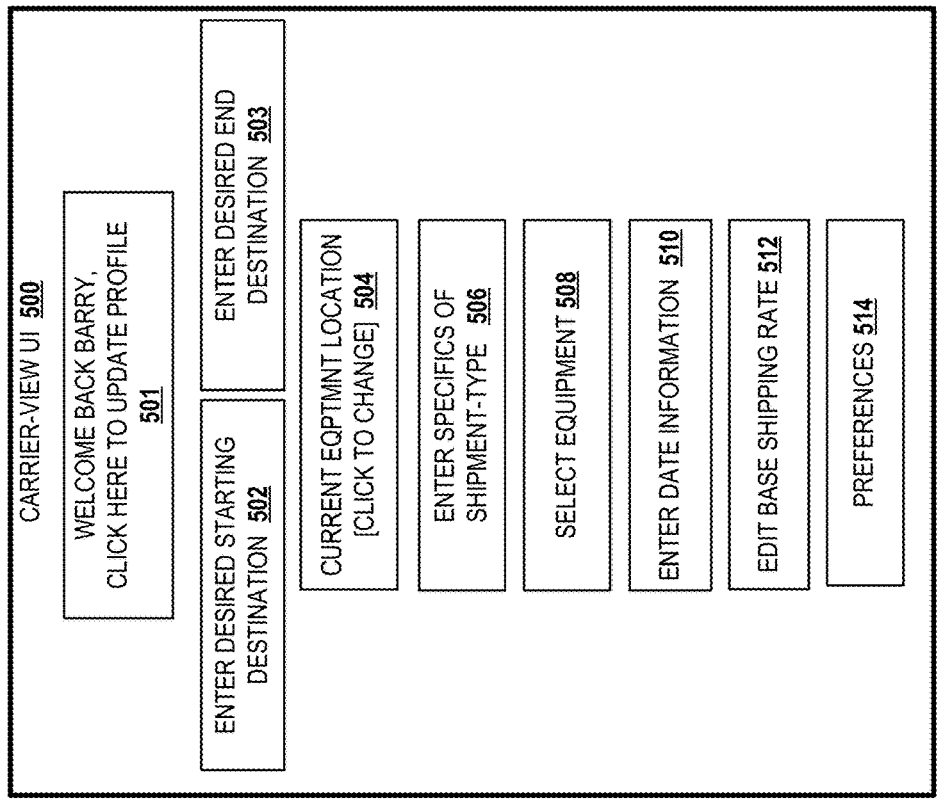

According to one embodiment and as illustrated in part by FIGS. 5-6, one or more of the plurality of CSIST modules configures the system to: receive login credential information from the carrier at a login portal of the CSIST framework 200. Then, in response to verifying the login credential information, the system provides access by the carrier to a carrier-view user interface (UI), and presents, within the carrier-view UI, a location of each of the at least one available shipment. Additionally, the system provides, for each available shipment, additional details associated with that shipment including the total number of empty miles and a price being offered by an associated shipper for completion of the shipment, where the opportunity cost for each shipment is determined based on both the number of empty miles and the price. FIG. 5 illustrates an example carrier-view UI 500 showing the initial set of prompts that can possibly be included in a shipping request data collection page of the UI 500. As shown, carrier view UI 500 includes a personalized greeting 501 that can include identifying the carrier by name or other unique ID. Then a series of prompts 502-514 are presented to the carrier to enable the carrier to enter information utilized to identify a best available shipment for the carrier. The series of prompts include: desired starting location 502, desired end destination 503, current location of equipment 504 (which can be greyed out if the equipment self-reports its location via an onboard global positioning location (GPS) sensor or other location sensor). In one embodiment, the carrier can specify both the desired start location 502 and desired end location 503, and no determination of the current location is required. This embodiment enables future booking of shipments based on fore-knowledge of where an equipment will be at some time/date in the future. For example, the equipment may currently be in route to Houston from California, and the carrier desires to pick up a next shipment within a specific radius of the Houston delivery address or hoteling location, with an end destination of Miami. The request can be made while the equipment is still in Arizona.

Prompts also include shipment type specifics 506 where the carrier may desire to have a specific type of shipment and the framework initially narrows the search to include only those types of shipment. Prompts further includes an optional entry to select a equipment 508 in situations when the carrier who has logged in has more than one shipment/cargo carrying equipment. Prompts also include date information 510, which may actually establish a date for departure from the shipper or a date of arrival at the delivery point. Prompts may also include an option to edit the base shipping rate 512 and prompts may include other preferences 514 that are established by the carrier.

Figure 7:
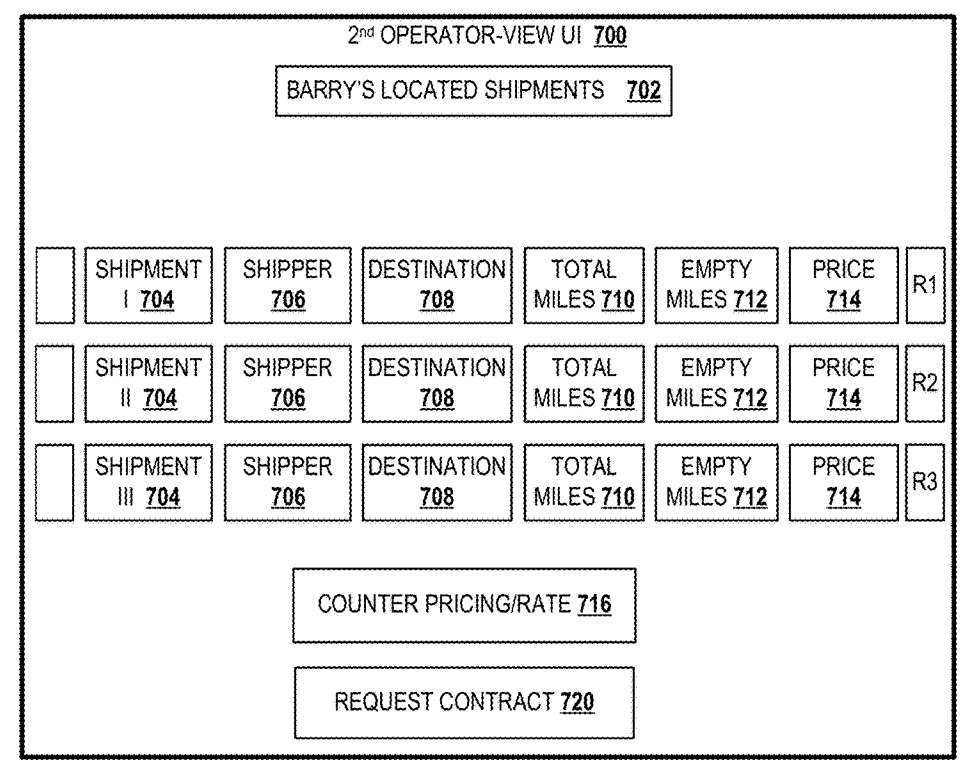

Referring again to FIG. 2 and with further reference to FIGS. 3, 4, and 7, according to one embodiment, in response to receiving an input for a list view of the available shipments, the processor presents a second carrier-view UI listing each of the available shipments along with an associated opportunity cost for each available shipment. In one embodiment, a ranked listing of the available shipments can be triggered by one of a user selection or a default setting of the second carrier-view UI. As shown by FIG. 7, second carrier-view UI presents a list of the available shipments along with most of the details related to that shipment as may be required by the carrier. The carrier is able to select one of the shipments to either counter the price 716 or accept the offer and request a contract 720. The selection may be based on the relative ranking of each shipment, which may be tied to a corresponding ranking of the shipper.

As shown by FIG. 5, in one embodiment, one of the plurality of CSIST modules configures the system to: present a series of user prompts with associated input blocks within the UI to receive entry of specific content that identifies at least one of a desired end destination, a date and time of travel, a type of cargo and entry of optional, additional details by the carrier. Additional prompts are provided to identify a pick-up zone around the current location; and initiate the generation and update of the first UI based on the received entries to the series of prompts, wherein the carrier receives a personalized first user interface based in part on the entries and the current location of the equipment.

According to one embodiment, the plurality of CSIST modules configures the system to: identify a rating level of the carrier, wherein each carrier is assigned a rating level, ranging from a lowest, initial tier rating to a highest tier rating achieved based on certain pre-set criteria and historical performance; evaluate one or more characteristics of the equipment relative to established equipment requirements for each cargo that is determined to be an available shipment; and filter out from the displayed available shipments any shipments of cargo having an established equipment requirement that cannot be met by the equipment. Thus, only cargo whose established equipment requirements are met by the equipment are presented within the carrier-view UI as available shipments, irrespective of a carrier rating. The system also presents, as available shipments within the carrier-view UI, only shipments falling at or below a current rating level of the carrier, wherein the carrier is unable to view or select shipments intended to be assigned to carriers falling within a higher rating level than the current rating level of carrier. It is appreciated that in one embodiment, the granularity of the rating levels may be at the individual driver level, for large carriers, such that the individual drivers are rated and the carrier rating is then tied to an accumulation of the drivers working for the carrier.

According to another embodiment, the plurality of CSIST modules configures the system to: track each shipment completed by the carrier; receive inputs corresponding to one or more metrics being measured to determine successful completion of the shipment by the carrier; evaluate, based on the received inputs, whether the carrier successfully met all of one or more measured metrics; and in response to the carrier successfully meeting all of the measured metrics, provide an award that is registered within a carrier profile maintained within the CSIST database. The system further identifies when a total number of awards earned by the carrier reaches a next award threshold corresponding to attainment of a next rating level; and in response to the total number of awards earned reaching the next award threshold, elevates the carrier to a next rating level. The carrier becomes eligible to view additional available shipments that are restricted to being viewable only on carrier-view UIs of carriers within the next rating level, where the additional available shipments include higher value shipments.

Referring now to FIGS. 2, 4, 6, and 8, the plurality of CSIST modules configures the system to: in response to receiving a request, at the CSIST framework, from a registered shipper to locate a carrier to transport a shipment, the system: identifies whether at least one qualified pairing of carrier and equipment is available from among all qualified carriers and equipments registered with the CSIST framework. The carrier and equipment are available when located within a shipment pick-up zone, and the carrier and equipment are deemed a qualified pairing when the carrier meets a minimum rating level for desired carriers and the carrier's equipment meets the established equipment requirements for the equipments of the cargo being shipped. The system also compiles shipment details and provide the shipment details for presentation within a carrier-view UI for each qualified carrier associated with one of the at least one qualified pairing. FIG. 6 presents an example shipper-view UI 600 in which a shipper, Ron, initially logs into the framework using his login credentials. The framework 200 generates shipper view UI 600 with a personalized greeting 601 and other personalized features and/or selections associated with shipper, Ron. As shown, a first selectable option 602 is provided for Ron to access a map view of Ron's existing shipments in transit. In one embodiment, this screen is the default login screen for the shipper whenever the shipper has one or more shipments being completed that are being tracked via the framework 200. Additionally, shipper-view UI 600 includes a series of prompts that begins with a first prompt to enable the shipper to enter a new shipment 604. Below these prompts, and assuming selection of this option, a series of other prompts and entry blocks are provided to the shipper, including, without limitation, classification/type of cargo 606, shipment tracking function setup 608, shipment fee/rate 610. These prompts may also optionally include rating level of carrier/equipment 612 and also include other shipper preferences 614.

FIG. 8 presents an example second shipper-view UI 800 in which a listing is presented of the qualified pairings of carriers and equipments. Within the listing is presented an identifier of each carrier 804, the carrier's rating level 806, and the carrier's equipment information 808. In one embodiment, second shipper-view UI 800 can optionally include information about the total miles 810 and empty miles 812 for each of the carriers. Additionally, second shipper-view UI 800 includes each carrier's requested price 814, assuming the carrier is given an opportunity to bid or negotiate for the shipment. It is appreciated that in some embodiments, the price for the shipment is set by the shipper and no opportunity is given for the carriers to counter or negotiate the price. In yet another embodiment, the price for the shipment may be set by the framework 200, using know data about the shipment, carriers, equipments, etc., and the actual prices may vary across the different carriers. A ranking of the carriers can also be presented to assist the shipper in selecting the best carrier to assign the shipment to. Utilizing the framework methodology, a higher ranked carrier may have a higher price for the shipment, and the inverse may also be true. Where pricing is available for carrier selection, second shipper-view UI 800 also includes a counter pricing option 816. Finally, second shipper-view UI 800 also include a contract request option 820 whereby the shipper selects one of the carriers and assigns the shipment to that carrier for transportation.

Additionally, the system enables bi-directional negotiating of shipping particulars, including pricing, for the shipment between the registered shipper and the qualified carriers. Then, in response to completion of the negotiation and an acceptance of negotiated terms between the shipper and a carrier selected by the shipper, the system generates a contractual agreement for acceptance by the carrier within the carrier-view UI. The system then associates the negotiated terms of the contractual agreement with the shipment and stores the negotiated terms and shipment details within a data module of the CSIST framework. The terms of the contractual agreement are thus made available for future viewing by both the carrier and the shipper.

Figure 9:
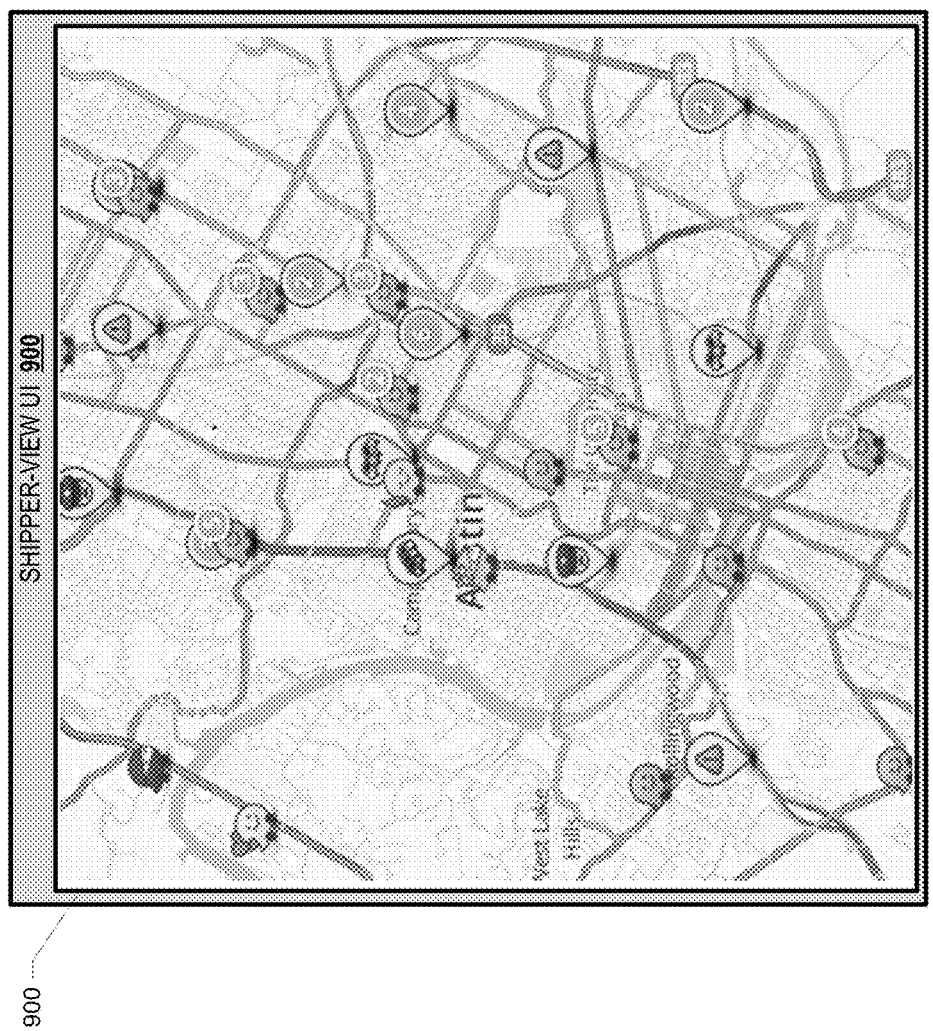
FIG. 9 provides a graphical user interface (GUI) depicting an example transportation/shipping map generated by the CSIST framework to facilitate shipper tracking of in-route shipments and location of available carrier equipments, in accordance with one embodiment.

As shown by FIG. 9, the one or more of the modules from among the plurality of CSIST modules configures the system to: present to each registered shipper a shipper-view UI 900 that maps each in-route, recently completed, and scheduled shipments associated with that registered shipper; and in response to pick-up of a shipment by an equipment, track movement of the equipment via received movement data and present a current location of the equipment on the shipper-view UI until completion of the shipment. Further, in response to selection by a shipper of a particular shipment on the shipper-view UI, the system: opens a secondary window (FIG. 10) that provides additional details about the particular shipment, from among a description of the cargo, a destination of the shipment, shipping-related date and time information, an identifier and contact information of the carrier/driver, and information about the equipment. The system also enables communication with the carrier via the secondary window utilizing the contact information.

FIGS. 10A-10B illustrates a pictorial view and a block view of the shipping details from shipper-view UI 900 presented in a list view within second shipper-view UI 1000, according to one or more embodiments. As shown by FIGS. 10A-10B, each shipment that is presented in shipper-view UI 900 is provided as a line entry within second shipper-view UI 1000. These line entries present pertinent details of each shipment, as indicated by the headings of table 1000B and 1010, including: destination address/city 1050, shipment number 1055, pick-up address 1060, shipper name 1065 (presented for views at the framework level, where the shipments are not necessarily all originating from a single shipper), carrier 1070, estimated time of arrival 1075. It is appreciated that the above list is not exclusive and is presented solely for example. Other information and/or data can be included, although not specifically shown within the example of second shipper-view UI 1000B. These other information can include, but are not limited to, type of equipment and current location of the equipment.

Additionally, according to one embodiment, the system initiates a tracking protocol to dynamically track an equipment of a shipment following pick-up of the cargo at the pick-up point; and updates the shipper UI as the equipment moves with the shipment. The system terminates the tracking protocol following successful completion of the shipment. As presented within secondary window 1010, certain environmental and route details can also be provided for each shipment, particularly where the equipments are equipped with additional on-board sensors that can feed sensed data back to framework in real time. The illustrative examples of this type of environmental information include, but are not limited to, road conditions 1080, weather 1085, and route 1085, without limitation. With the tracking protocol terminated, the processor removes the equipment signal from the shipper-view UI, and moves the shipment status indicator to a completed status within the second shipper-view UI 1000 and removes the shipment from the shipper view UI 900.

Figure 11:
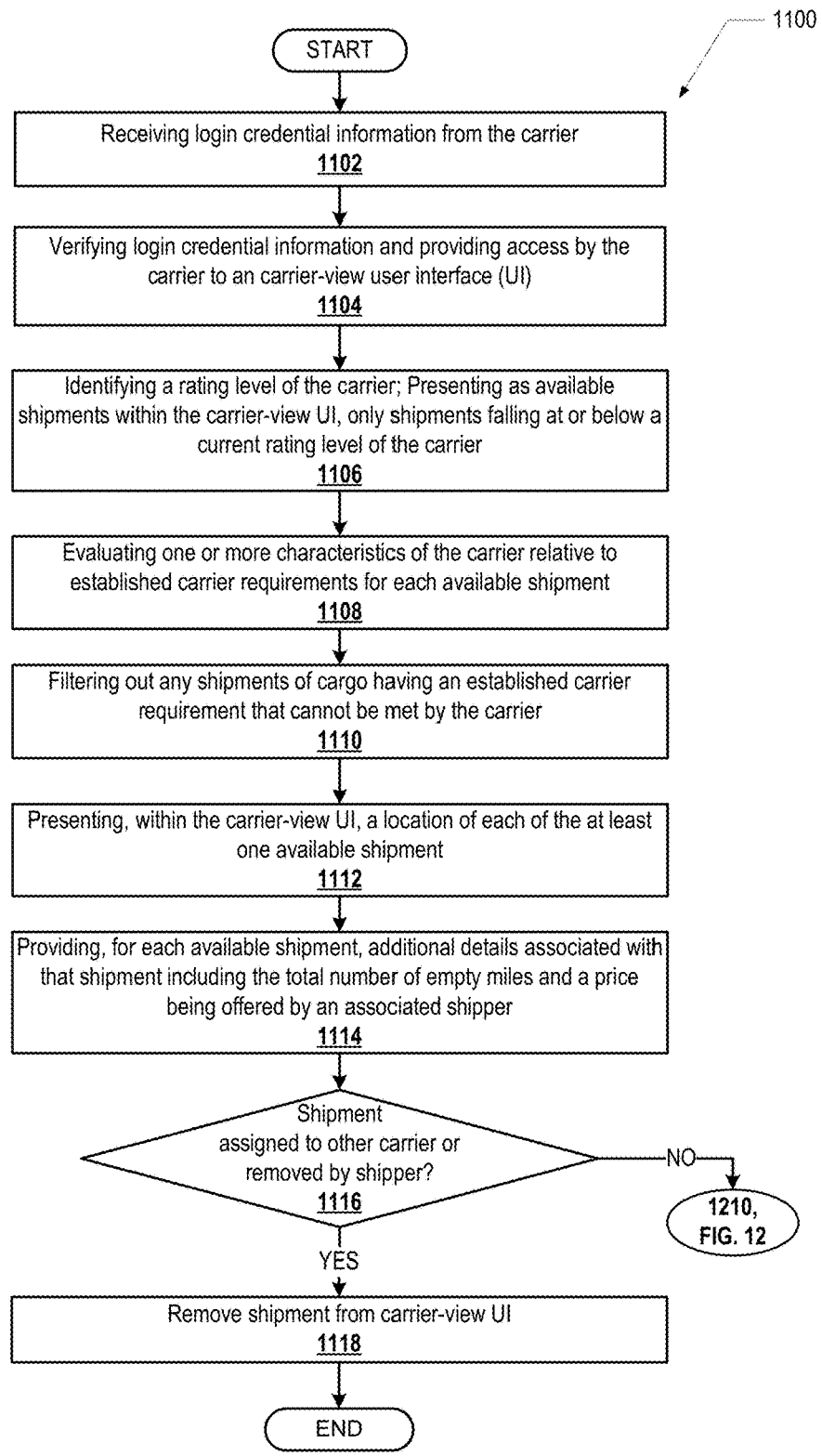
FIG. 11 presents a flow chart of an example method for opening a carrier-view UI on the CSIST framework and presenting shipment details on a map view to facilitate carrier selection of available shipments within a pick-up zone surrounding the location of the carrier's equipment, in accordance with one or more embodiments.
Figure 12A:
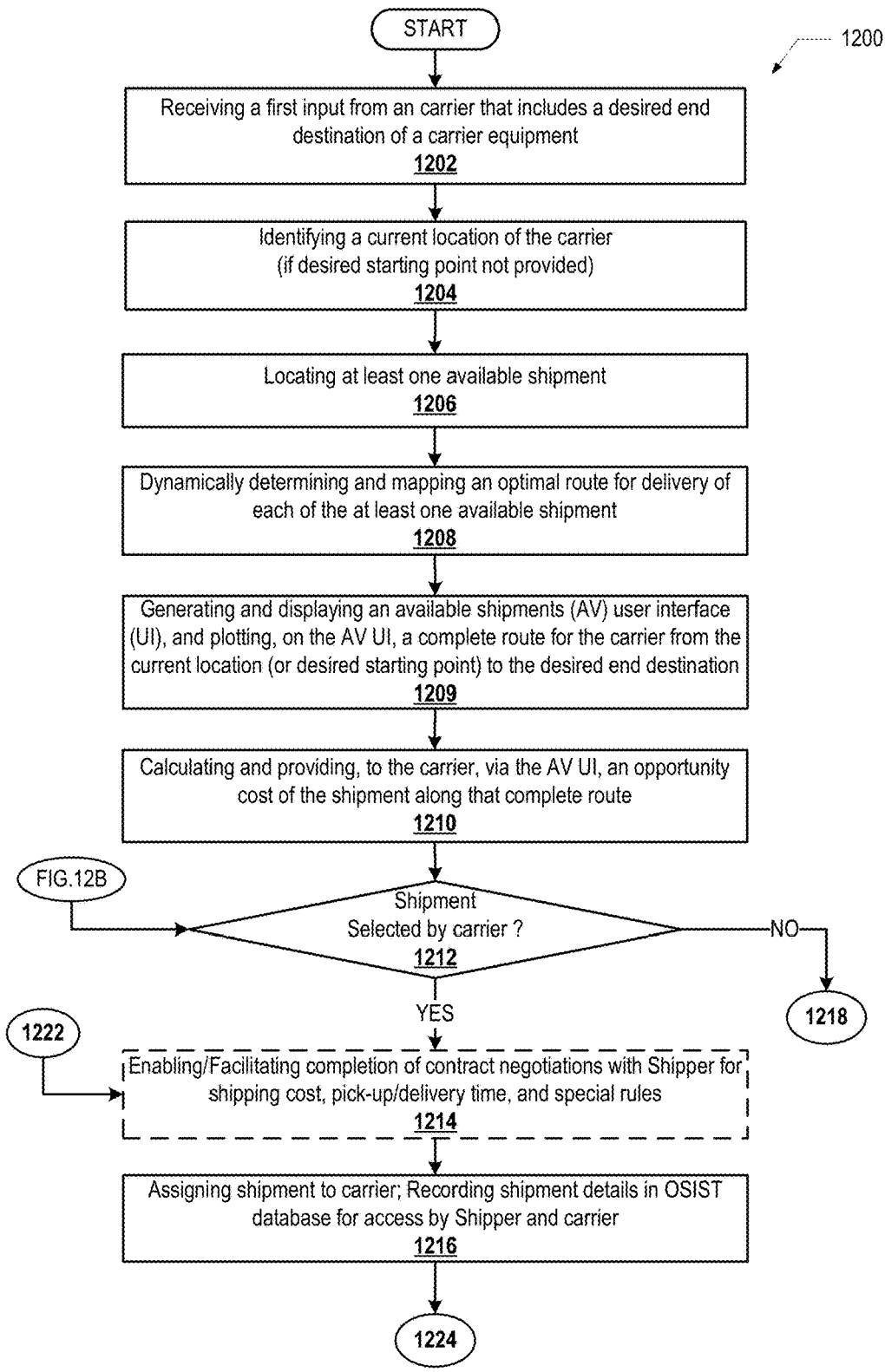
FIGS. 12A-12C present a flow chart of an example method of providing carrier-side interfacing with the CSIST framework to select a shipment based on carrier-entered data, in accordance with a plurality of embodiments.
Figure 12B:
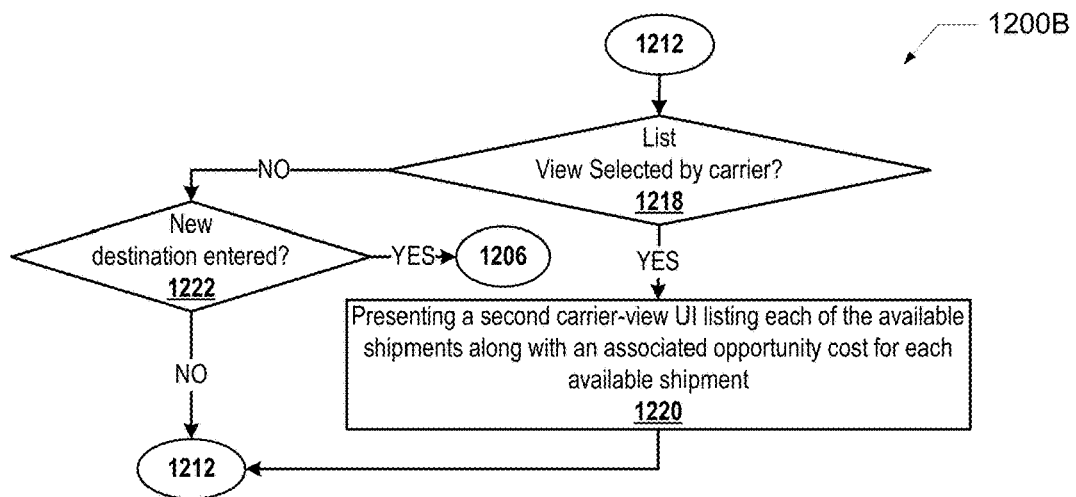
Figure 12C:
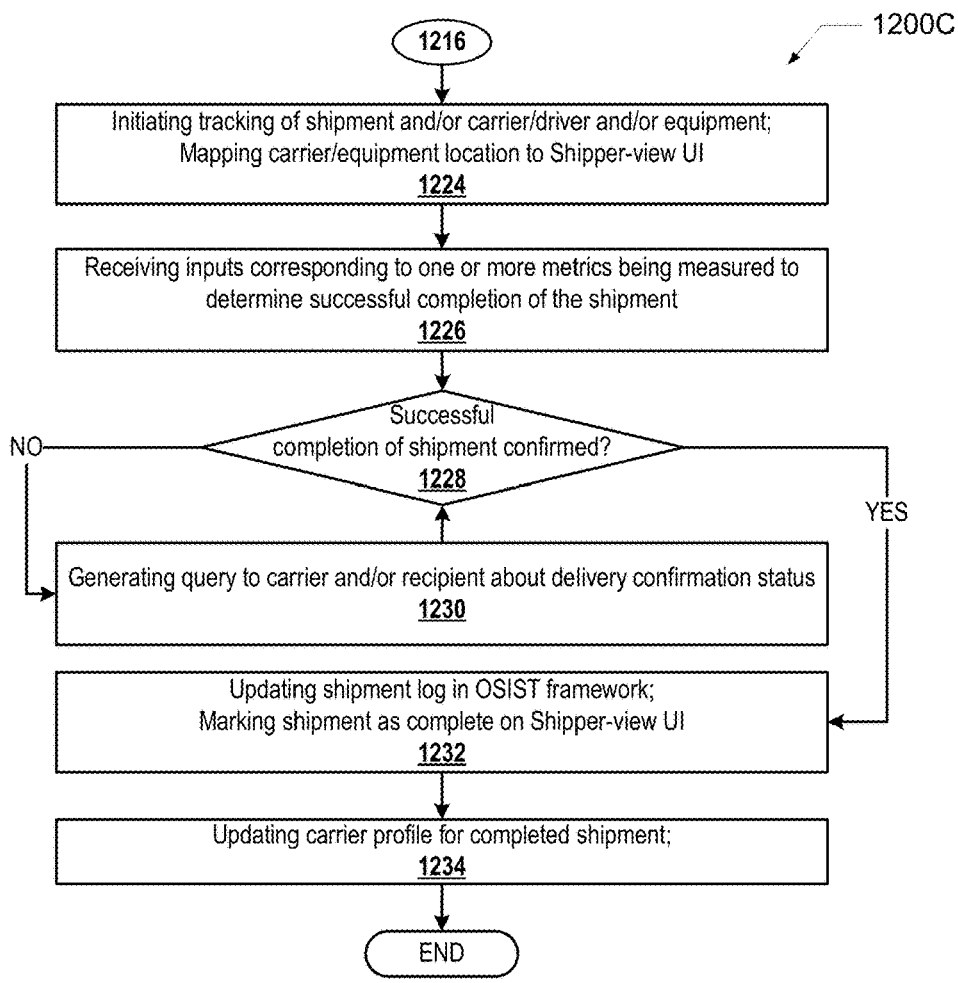
Figure 13:
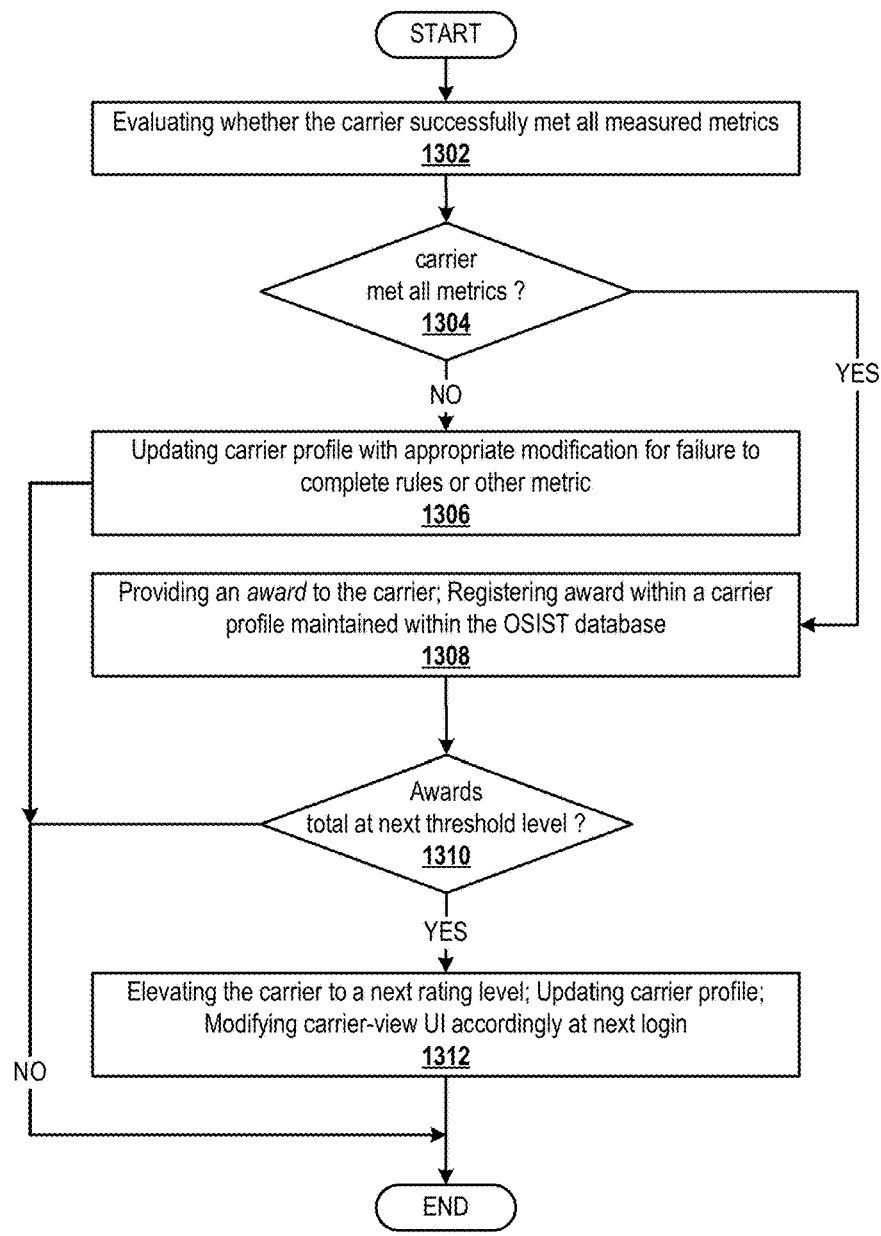
FIG. 13 is a flow chart that generally presents a method for providing awards and modifying a ranking or rating level of a carrier based on shipment completion, in accordance with one or more embodiments.
Figure 14A:
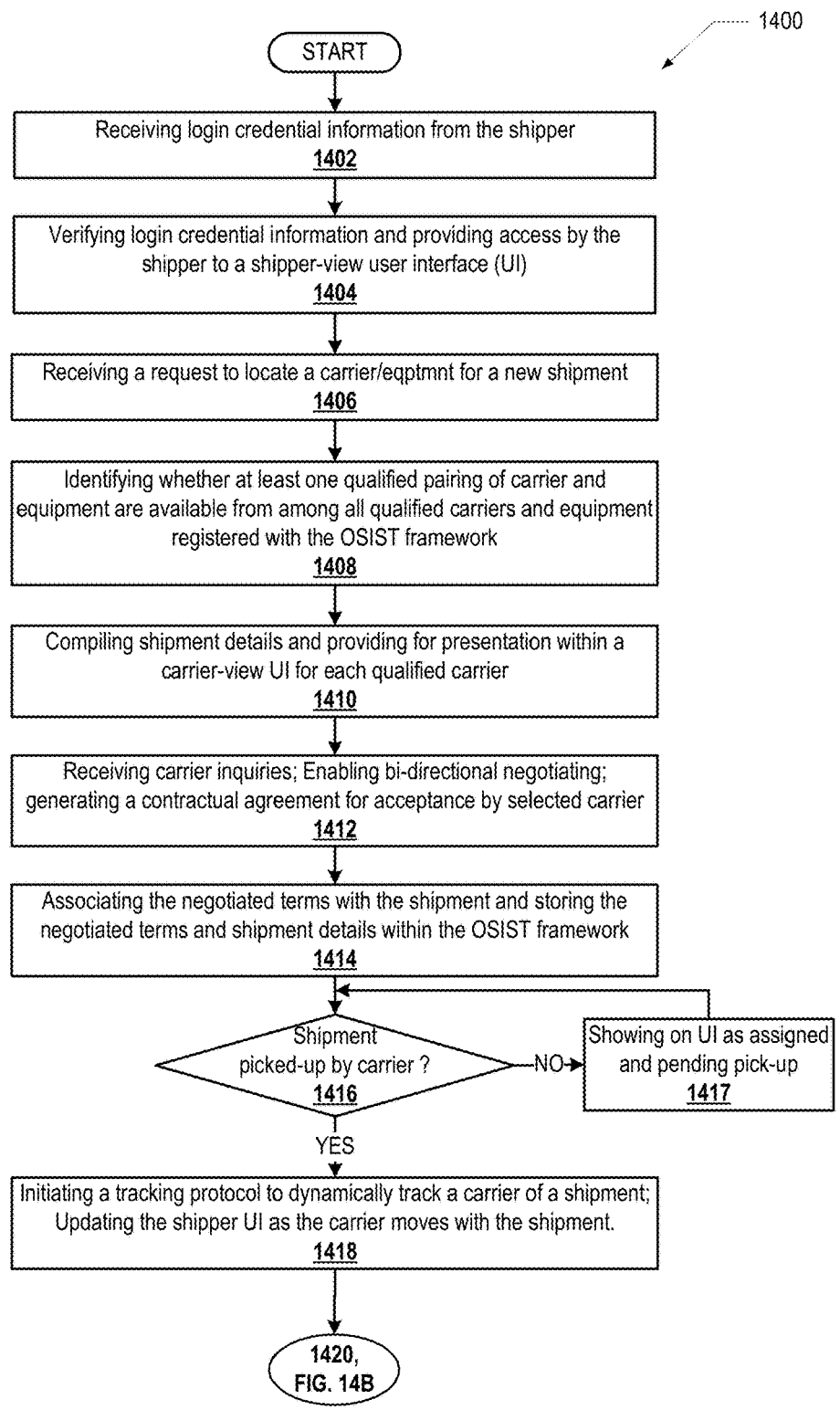
FIGS. 14A-14B present a flow chart of an example method for presenting a shipper-side UI to facilitate shipper-side interfacing with the CSIST framework, according to a plurality of embodiments.
Figure 14B:
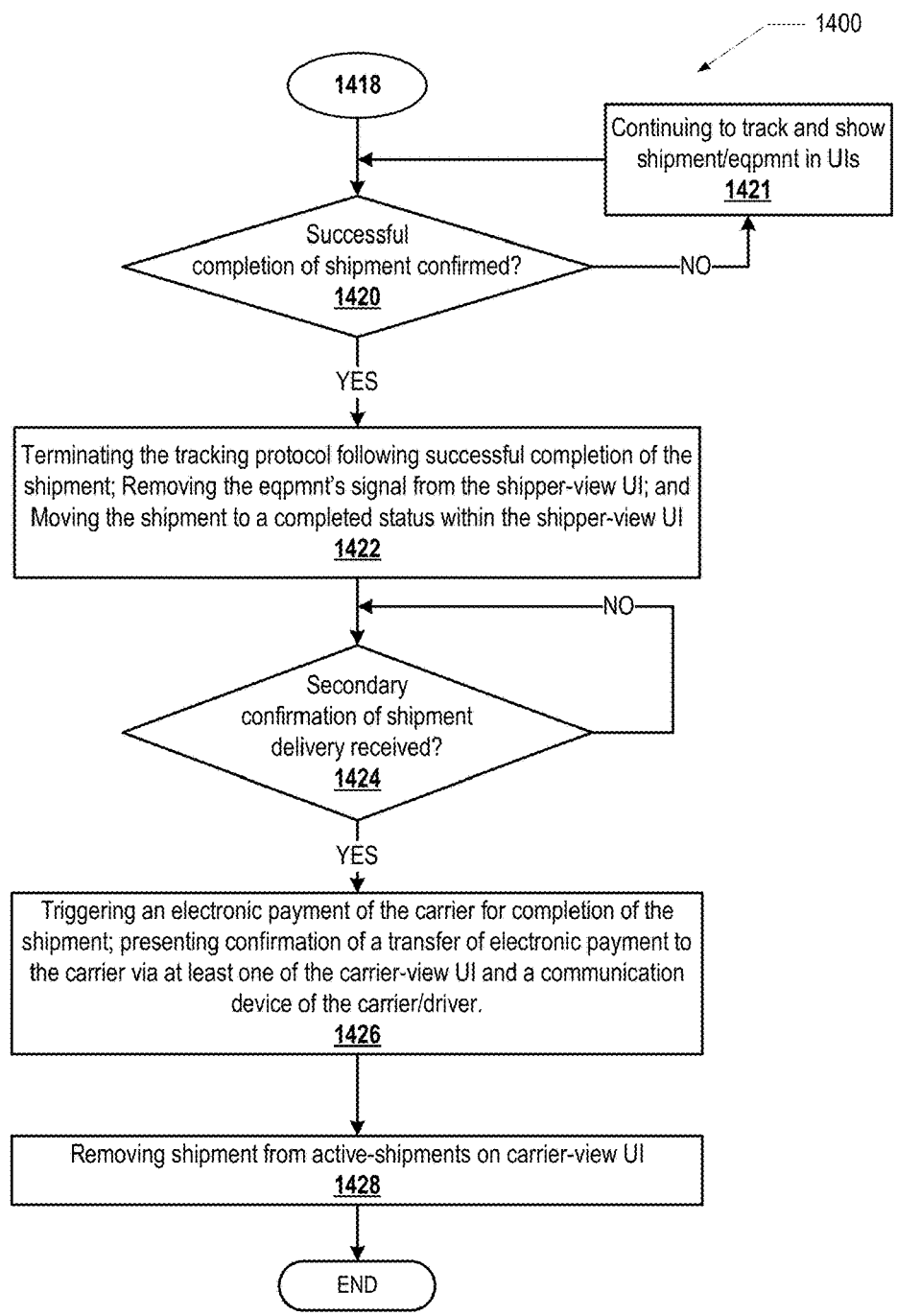
Figure 15:
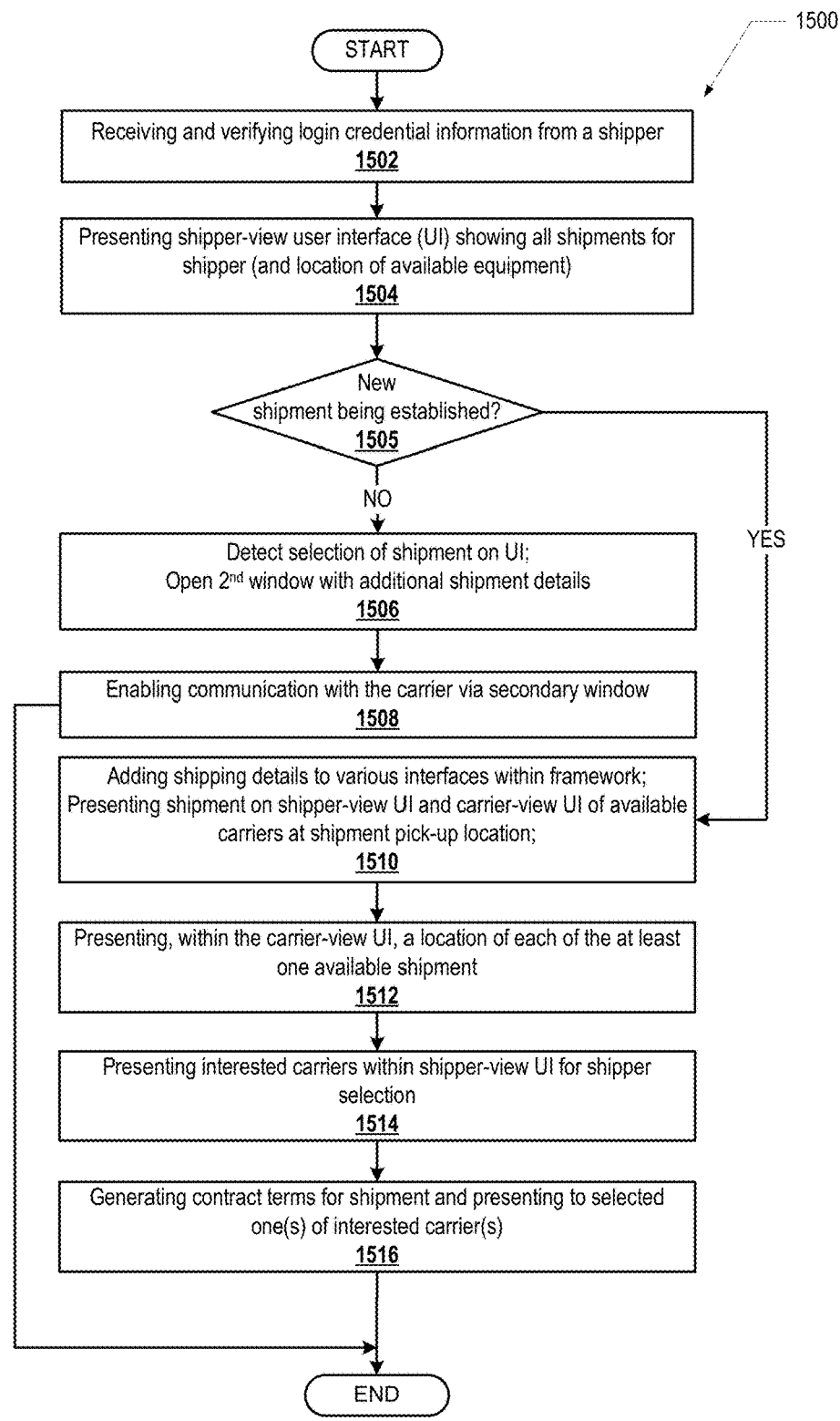
FIG. 15 is a flow chart that generally presents a method by which a shipper adds a new shipment to the CSIST framework and interfaces with the framework to complete assignment of the new shipment to a carrier, in accordance with one or more embodiments.

FIGS. 11-15 provide a series of flow charts presenting various methods performed by and/or within CSIST framework 200. Specifically, FIGS. 11-13 presents flow charts of example methods for implementing the carrier view-side processes that occur before, during, and after a shipment is completed via the CSIST framework 200, involving registered carriers, in according with a plurality of embodiments. FIGS. 14-15 then provide example methods for implementing the shipper-side processors that occur within the CSIST framework 200. Each method corresponds to execution of code from one or more of the functional modules within CSIST framework 200, and specifically the execution of code by processor/CPU 105 within a computing device, such as DPS 100. Aspects of the various methods are described with reference to the figures of FIGS. 1-10. For cohesiveness in describing features associated with the GUIs and display, the method will be described as being implemented within DPS 100 via processor 204 and/or functional modules of CSIST framework 200 that are executed by CPU 105.

Referring now to FIG. 11, which provides a method for carrier login and selection of shipments via a carrier-view UI, in accordance with one embodiment. Method 1100 begins at start block and proceeds to block 1102 at which method 1100 includes receiving login credential information from the carrier at a login portal of the CSIST framework. At block 1104, method includes verifying the login credential information and providing access by the carrier to a carrier-view user interface (UI). Method then includes identifying a rating level of the carrier and presenting as available shipments within the carrier-view UI, only shipments falling at or below a current rating level of the carrier (block 1106). According to one aspect, each carrier is assigned a rating, ranging from a lowest, initial tier rating to a highest tier rating achieved based on certain pre-set criteria and historical performance. Based on his/her specific rating level, a carrier is prevented from viewing or selection (i.e., unable to view or select) shipments intended to be assigned to carriers falling within a higher rating level than the current rating level of the carrier.

Method 1100 also includes evaluating one or more characteristics of the equipment relative to established equipment requirements for each cargo that is determined to be an available shipment (block 1108). And, method 1100 includes filtering out from the displayed available shipments any shipments of cargo having an established equipment requirement that cannot be met by the equipment (block 1110). By this filtering, only cargo whose established equipment requirements are met by the equipment are presented within the carrier-view UI as available shipments, irrespective of a carrier rating. This aspect is important for specialized products, such as those perishable products and products requiring refrigeration, for example. Method 1100 then includes presenting, within the carrier-view UI, a location of each of the at least one available shipment (block 1112), and providing, for each available shipment, additional details associated with that shipment including the total number of empty miles and a price being offered by an associated shipper for completion of the shipment (block 1114). In one embodiment, the opportunity cost for each shipment is determined based on both the number of empty miles and the price. As provided at decision block 1116, method includes determining whether a shipment is assigned to another carrier or has been removed by the shipper. When the shipment has been assigned to another carrier or has been removed from the shipper, method 100 proceeds to block 1210 of FIG. 12. In response to the shipment having been assigned or removed, method 1100 includes removing the shipment from the carrier-view UI in real time. By this process, real time updates are provided for all of the carrier-view UIs (and shipper-view UIs as well) across the entire framework. Method 1100 then ends.

FIGS. 12A-12C provide a flow chart of an example method 1200 which supports the carrier-side interfacing with the CSIST framework 200 to request a shipment and subsequent processing, in accordance with a plurality of embodiments. Method 1200 begins at start block and proceeds to block 1202 which includes receiving a first input from a carrier that includes a desired end destination of an equipment of the carrier. In this description, the equipment is a vehicle that is capable of transporting a shipment from a shipment pick-up point to a shipment delivery point. Method 1200 includes identifying a current location of the equipment, based on one of the received first input and received location data that is dynamically detected from a location tracking device associated with one of a communication device of the carrier and the equipment (block 1204). In one alternate embodiment, method 1200 can also include receiving a desired start destination, in which case the current location is not required or utilized in evaluating a best shipment. Method 1200 then includes the processor locating at least one available shipment having at least one of (i) a shipment pick-up point within a pre-established, shipment pick-up zone corresponding to an acceptable radius around the current location or the desired start location (in the alternate embodiment, where that information is provided) and (ii) a shipment delivery point within an acceptable shipment drop-off zone of the desired end destination (block 1206). According to one aspect, the shipment pick-up point can be a different location from the current location or the desired starting point of the equipment and the shipment delivery point can be a different location from the desired end destination.

Method 1200 includes the processor dynamically determining and mapping an optimal route for delivery of each of the at least one available shipment from a respective, corresponding shipment pick-up point to a respective, corresponding shipment delivery point (block 1208). Then, method 1200 provides generating and displaying an available shipments (AV) user interface (UI), and plotting, on the AV UI, a complete route for the equipment from the current location to the desired end destination (block 1209). The route includes a first path from the current location to the shipment pick-up point, at least one middle path including the optimal route for the corresponding shipment, and a third path from the shipment delivery point to the desired end destination. At block 1210, method includes calculating and providing, to the carrier, via the AV UI, an opportunity cost of the shipment along that complete route. The opportunity cost is based in part on a total number of empty miles associated with at least one of the first path and the second path.

At decision block 1212, a determination is made whether a shipment is selected by the carrier within the carrier-view UI. In response to selection of the shipment by the carrier, method optionally includes enabling/facilitating completion of contract negotiations with the shipper, including for example, terms related to shipping cost, pick-up and/or delivery time, and special rules for the carrier to follow (block 1214). Method further includes assigning the shipment to carrier and recording the shipment details in the CSIST database for access by the shipper and carrier (block 1216).

According to one embodiment, and as illustrated by FIG. 12B, method 1200 includes determining and/or detecting selection of a list view by the carrier (block 1218). In response to receiving an input for a list view of the available shipments, method 1200 includes the processor presenting a second carrier-view UI listing each of the available shipments along with an associated opportunity cost for each available shipment (block 1220). Accordingly, a ranked listing of the available shipments can be triggered by one of a user selection or a default setting of the second carrier-view UI. Method then returns to block 1212 (FIG. 12A). Moving from decision block 1218 to decision block 1222, method 1200 includes a determination of whether the carrier has entered a new starting point or a new destination. Method 1200 transitions to either block 1206 or block 1212 based on the result of that determination.

Turning to FIG. 12C, method 1200 proceeds from block 1216 (FIG. 12A) to block 1224 where method 1200 provides initiating tracking of each shipment and/or equipment and mapping the equipment location in the shipper-view UI. Method 1200 further includes receiving inputs corresponding to one or more metrics being measured to determine successful completion of the shipment by the carrier (block 1226). Method then includes evaluating (at decision block 1228) whether successful completion of the shipment has been confirmed. In response to not receiving confirmation of the shipment completion, method 1200 includes generating query to the carrier and/or the recipient to confirm the delivery confirmation (block 1230). However, once shipment delivery is confirmed, method 1200 includes updating the shipment log in CSIST framework and marking the shipment as complete on the shipper-view UI (block 1232). Method 1200 further includes updating the carrier profile to record the successful completion of the shipment (block 1234). Method 1200 then ends.

According to one or more embodiments, additional aspects of the method features are provided by CSIST framework 200, including the following, without limitation: receiving from a carrier a first set of credential information that identifies relevant personal and professional data associated with the carrier; initiating a background check of the carrier utilizing the first set of credential information; evaluating a suitability of the carrier to be affiliated with the CSIST framework for possible selection to transport shipments; in response to determining the carrier is a suitable candidate for inclusion in a CSIST carrier group, assigning an initial rating level to the carrier; establishing an initial fee rate for the carrier for use during a an initial trial period.

Then CSIST framework 200 also provides: in response to the carrier successfully completing one or more shipments, modifying the initial rating level and the initial fee rate, based on a determined service level of the carrier. According to one embodiment, modifying the initial rating level and initial fee rate comprises: receiving feedback from one or more of the shipper and a recipient of cargo from one or more shipments completed by the carrier/driver(s); and comparing shipping data related to the shipment, including data from among length of time to complete shipment, route taken, responsiveness of the carrier, timing for submission of documentation, safety considerations, speed of travelled relative to known speed limits, and comparative data of other shipments along similar routes.

As one additional aspect of the disclosure, CSIST framework 200 further provides the functions of: receiving confirmation of the receipt/delivery of the shipment at the delivery point; recording delivery statistics utilized to rate a service level of the carrier; and updating the service level within a profile associated with the carrier, wherein the service level is utilized to rate the carrier relative to other carriers and for future selections and/or assignment of shipping contracts. Accordingly, the service level can be utilized by a shipper to select from among multiple available carriers.

FIG. 13 provides additional details of the carrier profile update that occurs on completion of a shipment. Method 1300 begins at start block and proceeds to block 1302 at which method includes evaluating, based on the received inputs, whether the carrier/driver successfully met all of one or more measured metrics. Method 1300 includes determining, at decision block 1304, whether all metrics (including shipping rules, etc.) has been met. As an example, in one embodiment, a red zone rule can be provided whereby the carrier is expected to travel at least 200 miles towards his destination following shipment pickup before stopping the equipment. An award or financial incentive can then be tied to the shipment if carrier compliance is verified. In response to the carrier not meeting all the assigned metrics or rules, method includes updating the carrier profile with an appropriate modification for failure to complete all required rules or meet any required metric (block 1306) Method then transitions to end block. However, in response to the carrier successfully meeting all of the measured metrics, method includes providing an award that is registered within a carrier profile maintained within the CSIST database (block 1308). It should be noted that in addition to a virtual award towards rating level, the framework also includes some criterion for providing monetary tips to the drivers and/or providing other tangible financial and/or non-financial benefit (e.g., free gasoline) for meeting the required metrics or rules. At decision block 1310, method includes identifying when a total number of awards earned by the carrier reaches a next award threshold corresponding to attainment of a next rating level. In response to the total number of awards earned reaching the next award threshold, method includes elevating the carrier to a next rating level (block 1312). With the attainment of this next higher level, the carrier becomes eligible to view additional available shipments that are restricted to being viewable only on carrier-view UIs of carriers within the next rating level. In at least one embodiment, the additional available shipments can include higher value shipments.

Figure 19:
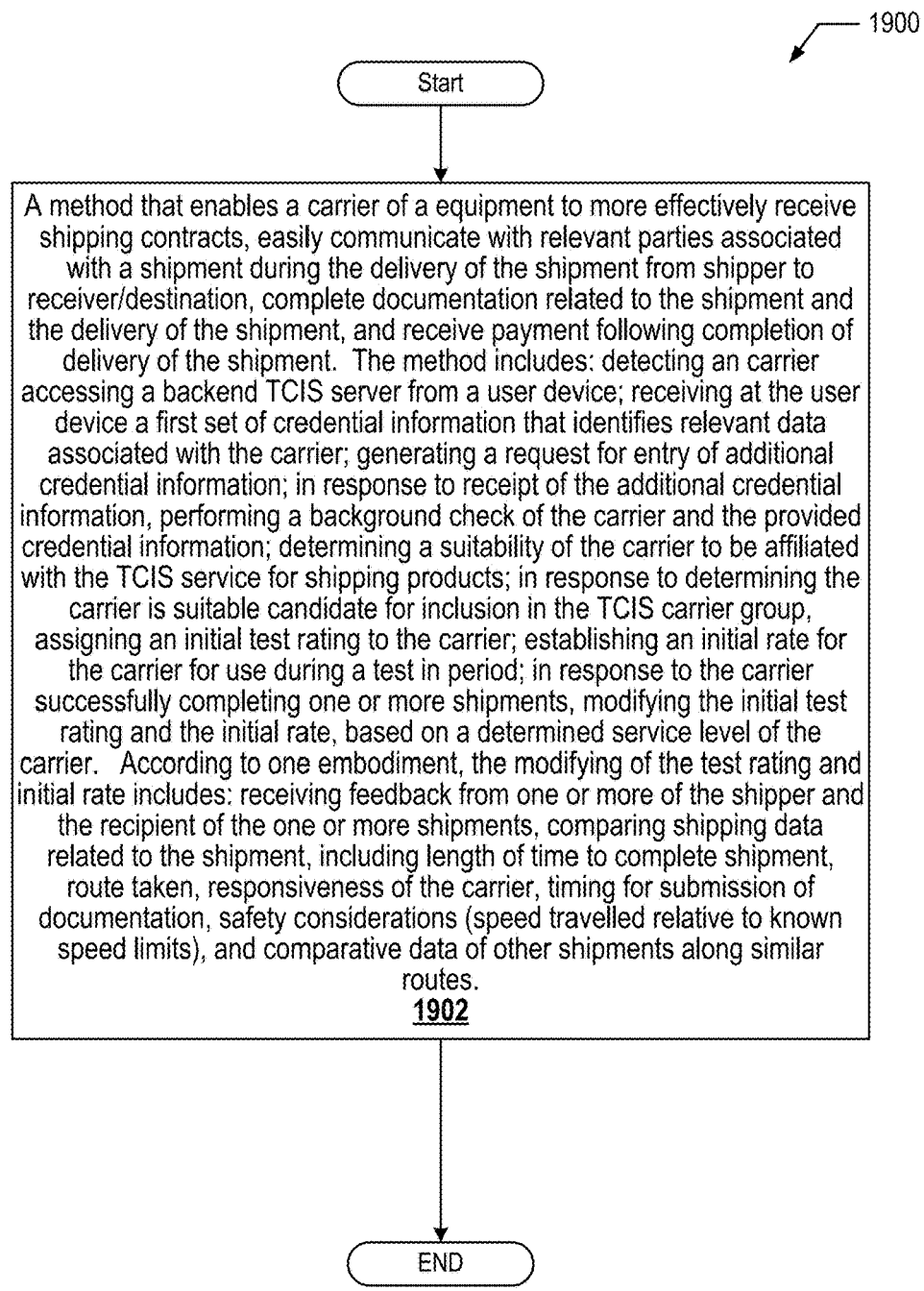
FIGS. 19-23 generally present various methods by which the carrier/driver and/or shipper communicates with and receives shipping and real-time, performance-related information from the CSIST framework via the MC device of the carrier/driver and the TCIS, in accordance with a plurality of different embodiments.

Thus, with the above described feature, one aspect of the disclosure provides a sequence of processes that collectively provides a method to enable a carrier of an equipment to more effectively receive shipping contracts, easily communicate with relevant parties associated with a shipment during the delivery of the shipment from shipper pick-up point to delivery or drop-off point, provide complete documentation related to the shipment and the delivery of the shipment, and receive payment following completion of delivery of the shipment. The method is generally illustrated by FIG. 19 and includes in block 1902: detecting a carrier accessing a backend CSIST/TCIS server (e.g., DPS 100) from a user device; receiving at the user device a first set of credential information that identifies relevant data associated with the carrier; generating a request for entry of additional credential information; in response to receipt of the additional credential information, performing a background check of the carrier and the provided credential information; determining a suitability of the carrier to be affiliated with the TCIS service for shipping products; in response to determining the carrier is a suitable candidate for inclusion in the TCIS carrier group, assigning an initial test rating to the carrier; establishing an initial rate for the carrier for use during a test-in period; in response to the carrier successfully completing one or more shipments, modifying the initial test rating and the initial rate, based on a determined service level of the carrier. According to one embodiment, the modifying of the test rating and initial rate includes: receiving feedback from one or more of the shipper and the recipient of the one or more shipments, comparing shipping data related to the shipment, including a length of time to complete the shipment, route taken, responsiveness of the carrier, timing for submission of documentation, safety considerations (speed travelled relative to known speed limits), and comparative data of other shipments along similar routes.

Figure 16:
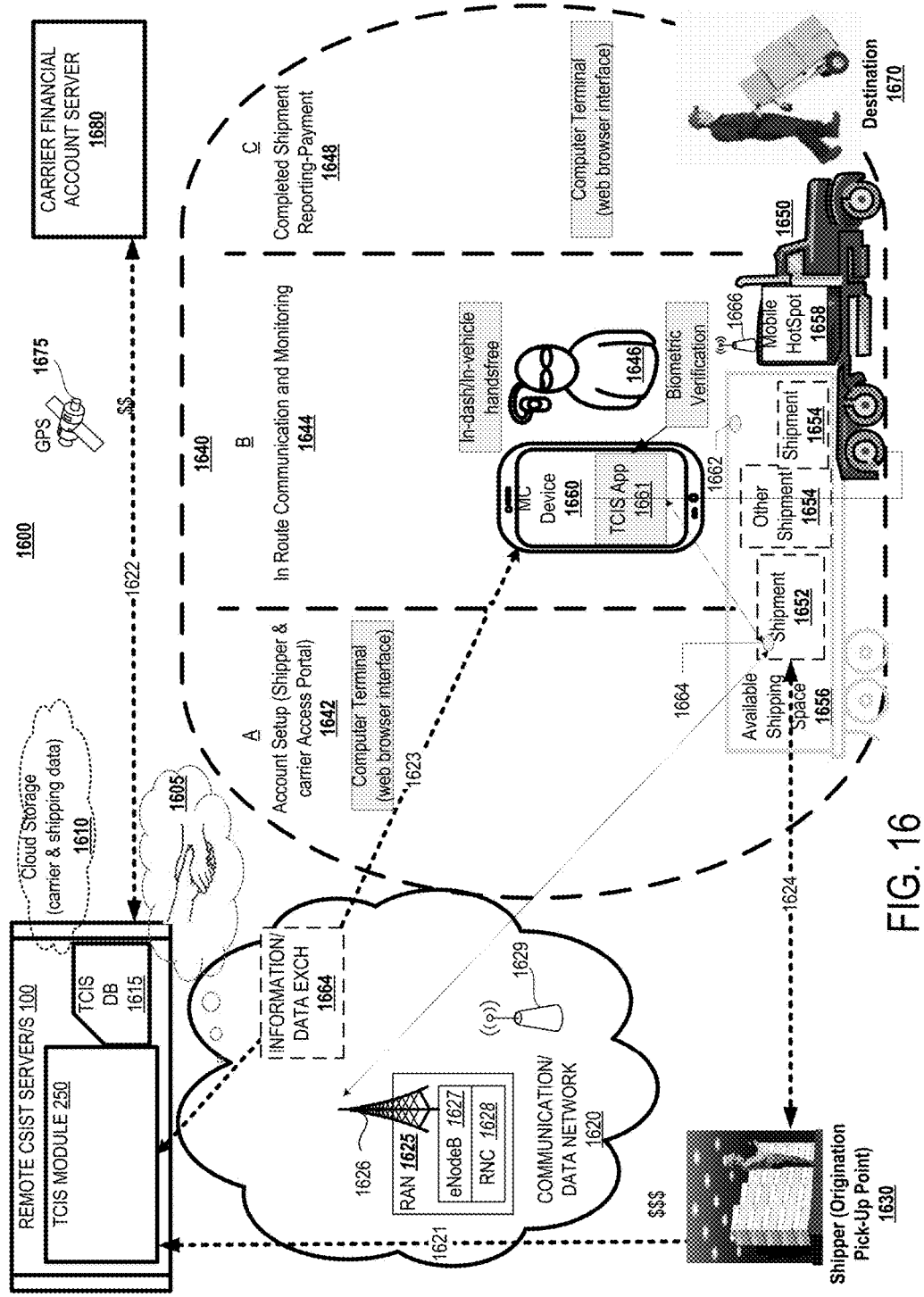
FIG. 16 illustrates an example trucking communication interface system (TCIS) and TCIS network that extends from the CSIST framework to enable efficient communication with carriers and tracking of shipments and carrier equipments, according to one or more embodiments.
Figure 20:
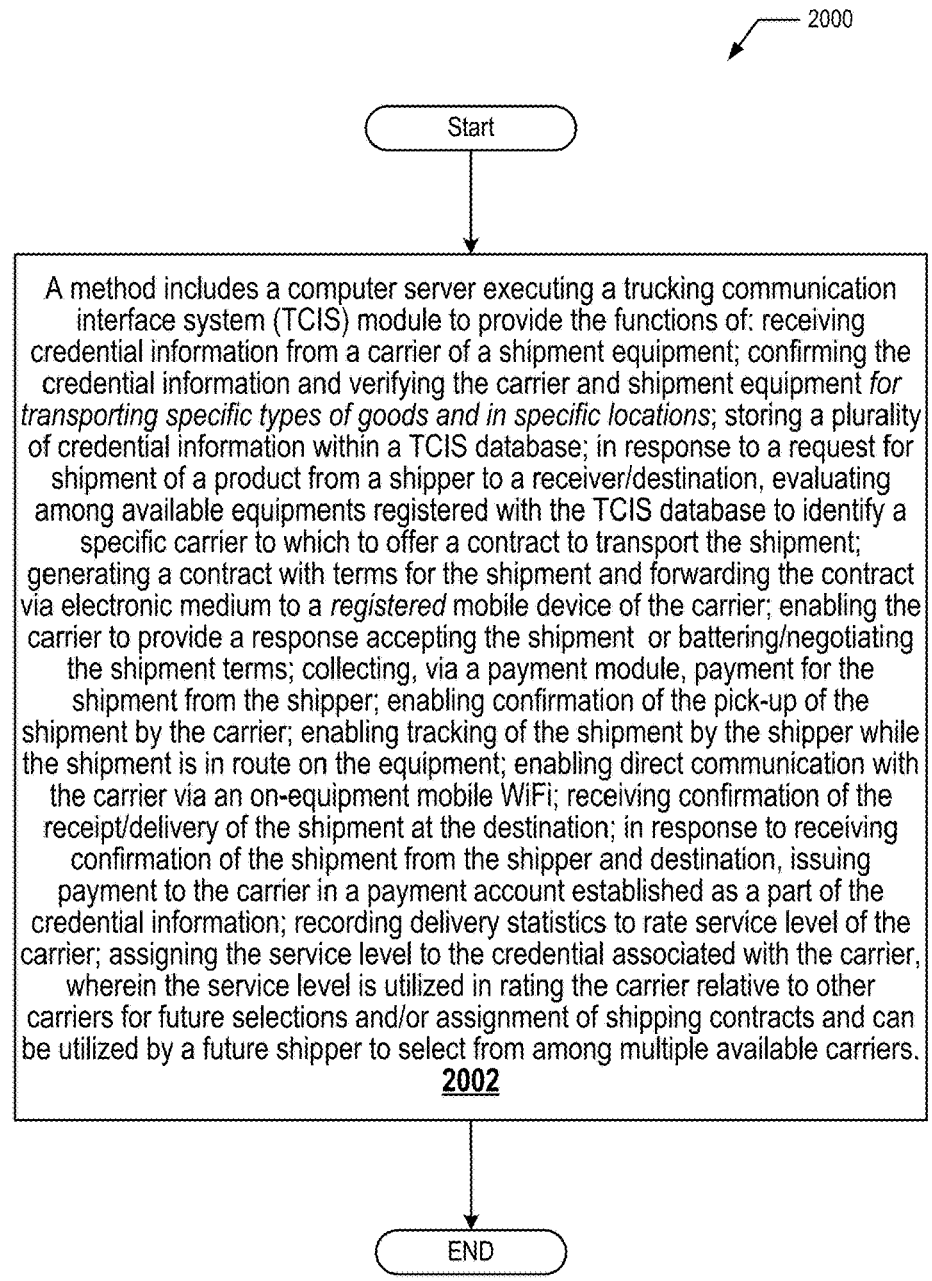

In one embodiment, the method includes a computer server executing modules of a CSIST framework 200 that includes trucking communication interface system (TCIS) module 250 to provide various functions. The method is generally illustrated by FIG. 20 and includes in block 2002: receiving credential information from a carrier of a shipment equipment; confirming the credential information and verifying the carrier and shipment equipment for transporting specific types of goods and within specific locations; storing a plurality of credential information within a TCIS database; in response to a request for shipment of a product from a shipper to a delivery/drop-off address/location, evaluating among available equipments registered with the TCIS database to identify a specific carrier to which to offer a contract to transport the shipment; generating a contract with terms for the shipment and forwarding the contract via electronic medium to a registered mobile device of the carrier; enabling the carrier to provide a response accepting the shipment or bartering/negotiating the shipment terms; collecting, via a payment module, payment for the shipment from the shipper; enabling confirmation of the pick-up of the shipment by the carrier; enabling tracking of the shipment by the shipper while the shipment is in route on the equipment; enabling direct communication with the carrier via an on-equipment mobile WiFi; receiving confirmation of the receipt/delivery of the shipment at the drop-off point; in response to receiving confirmation of the shipment from the shipper and drop-off point, issuing payment to the carrier in a payment account established as a part of the credential information; recording delivery statistics to rate a service level of the carrier; assigning the service level to the credential profile associated with the carrier, wherein the service level is utilized in rating the carrier relative to other carriers for future selections and/or assignment of shipping contracts and can be utilized by a future shipper to select from among multiple available carriers. According to one embodiment, the plurality of credential information includes biometric data of the carrier that is then utilized to verify the carrier at one or more points of the shipment (e.g., during the pickup of the shipment, prior to communication while the shipment is in route, before allowing on-board access to remove the shipment via unlocking a lock or accessing a secured area within the equipment). Additionally, in one or more embodiments, the method also includes enabling in-shipment monitoring and/or tracking and carrier and shipment security. With this embodiment, as illustrated in FIG. 16, which is described later, one or more sensors are placed on the shipment and/or within or on the equipment, each transmitting a unique code that is detectable at the TCIS server, via a data communication access point or transmission service, is decoded for use within the CSIST framework, and then made viewable by the shipper. The TCIS system and the shipper are thus able to track the shipment and environmental conditions while the shipment is in route.

Figure 21:
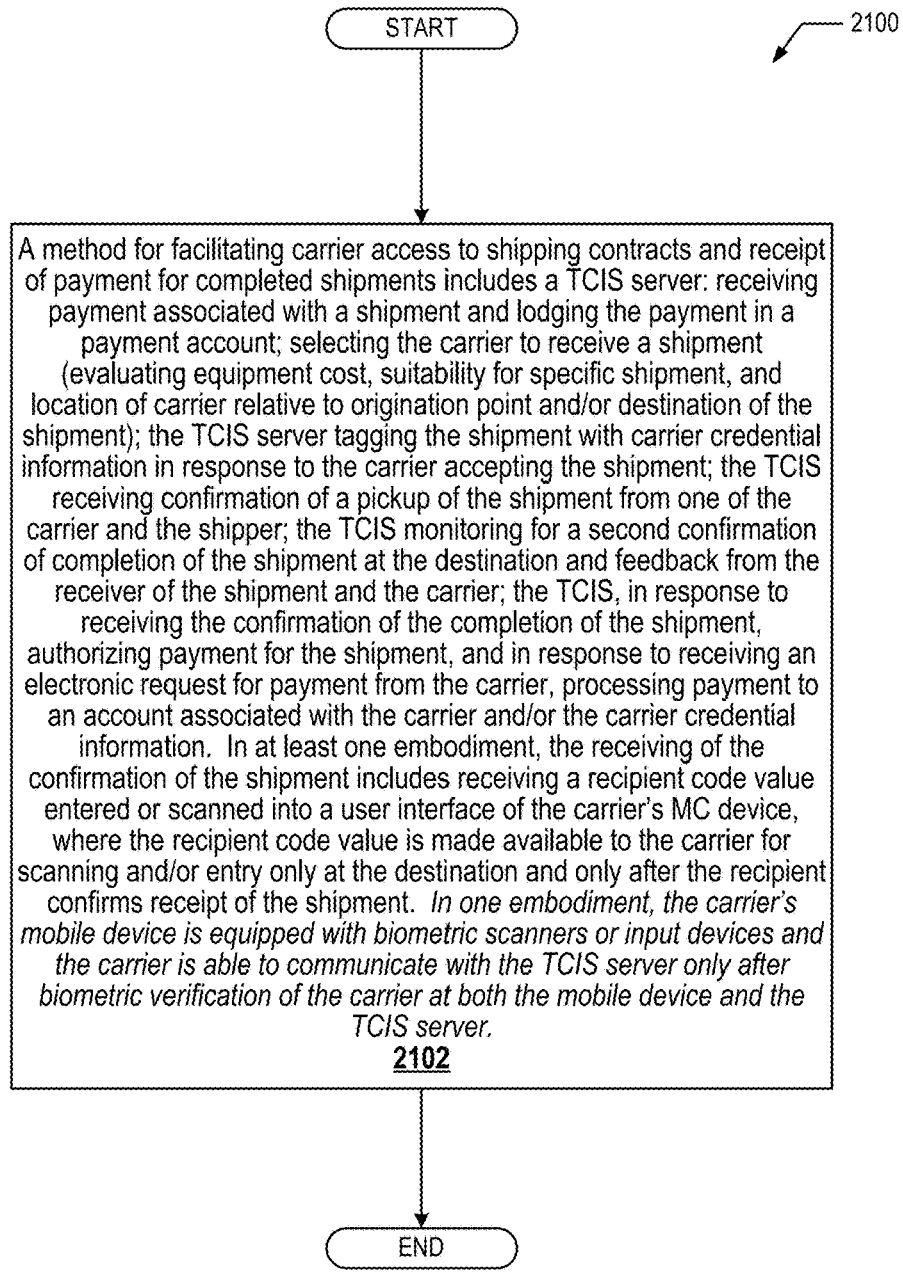

Also, the executable modules of CSIST framework 200 provides a series of processes that collectively presents a method for facilitating carrier access to shipping contracts and receipt of payment for completed shipments includes a TCIS server, which, in some embodiments, may be synonymous with the CSIST computing device 100. The method 2100 is generally illustrated by FIG. 21 and includes, in block 2102: receiving payment associated with a shipment and lodging the payment in a payment account; selecting the carrier to receive a shipment (evaluating equipment cost, suitability for a specific shipment, and a location of the carrier relative to a pick-up point and/or a delivery point of the shipment); the TCIS server tagging the shipment with carrier credential information in response to the carrier accepting the shipment; the TCIS receiving confirmation of a pickup of the shipment from one of the carrier and the shipper; the TCIS monitoring for a second confirmation of completion of the shipment at the drop-off point and feedback from the receiver of the shipment and the carrier; the TCIS, in response to receiving the confirmation of the completion of the shipment, authorizing payment for the shipment, and in response to receiving an electronic request for payment from the carrier, processing payment to an account associated with the carrier and/or the carrier credential information. In at least one embodiment, the receiving of the confirmation of the shipment includes receiving a recipient code value entered or scanned into a user interface of the carrier's MC device, where the recipient code value is made available to the carrier for scanning and/or entry only at the delivery/drop-off point and only after the recipient confirms receipt of the shipment.

Turning now to FIGS. 14A-14B, which present a flow chart of an example method by which a shipper-side interfacing with the CSIST framework is supported, according to a plurality of embodiments. Method 1400 begins at start block and proceeds to block 1402 at which method 1400 includes receiving login credential from the shipper (block 1402). Method 1400 includes verifying the login credential and providing access to the shipper-view UI (block 1404). Method 1400 then includes the receiving a request at the framework (from a shipper) to locate a carrier/equipment pair for a new shipment (block 1406). In response to receiving a request from a registered shipper to locate a carrier to transport a shipment, the request being received at the CSIST framework, method 1400 includes: identifying whether at least one qualified pairing of carrier and equipment are available from among all qualified carriers and equipments registered with the CSIST framework (block 1408). According to one embodiment, the carrier and equipment are available when located within a shipment pick-up zone and are a qualified pairing when the carrier meets a minimum rating level for desired carriers and the carrier's equipment meets the established equipment requirements for the equipment of the cargo being shipped. Then, at block 1410, method 1400 includes compiling shipment details and providing the shipment details for presentation within a carrier-view UI for each qualified carrier associated with one of the at least one qualified pairing. At block 1412, method further provides for receiving carrier queries and enabling bi-directional negotiating prior to generating an electronic contractual agreement for acceptance by the selected carrier within the carrier-view UI. Thus, one aspect of the framework is the enabling of bi-directional negotiating between the registered shipper and the qualified carriers of shipping particulars (e.g., pricing) for the shipment. Method 1400 further provides associating the negotiated terms of the contractual agreement with the shipment and storing the negotiated terms and shipment details within a data module of the CSIST framework that is available for future viewing by both the carrier and the shipper (block 1414).

At decision block 1416, method includes determining whether the shipment has been picked-up by the carrier. If the shipment has not yet been picked-up, method 1400 includes showing the shipment as assigned and pending pick-up on the shipper's UI and on the selected carrier's UI (block 1417). Method further includes initiating a tracking protocol to dynamically track an equipment transporting a shipment following pick-up of the cargo at the pick-up point and updating the shipper UI as the equipment moves with the shipment (block 1418). Method then checks at block 1420 (FIG. 14B) whether a successful completion of shipment has been confirmed. If the completion is not confirmed, method 1400 includes continuing to track the shipment and/or equipment via the framework and visually presenting the location of the shipment/equipment on the shipper-view UI and the carrier-view UI as an incomplete (in-route) shipment (block 1421). However, on confirmation of successful completion, method 1400 includes terminating the tracking protocol following successful completion of the shipment, whereby the processor removes the equipment signal from the shipper-view UI, and moving the shipment to a completed status within the shipper-view UI (block 1422).

At decision block 1424, method includes determining if a secondary verification/confirmation of the shipment delivery is received. According to one embodiment, the secondary confirmation can be a picture taken by the carrier/driver of a signature or stamp of the recipient signing for receipt of the shipment. The picture is taken on the carrier's WC device and uploaded to the framework, where the picture can be made available to the shipper. In another embodiment, secondary confirmation can include the recipient providing the confirmation or the shipment itself providing a signal of its location within the destination area after the equipment signal has left the location. Other forms of secondary confirmation can also be employed in alternate embodiments.

Method 1400 includes, in response to receiving the secondary verification, triggering an electronic payment of the carrier for completion of the shipment and presenting confirmation of a transfer of electronic payment to the carrier via at least one of the carrier-view UI and a communication device of the carrier/driver (block 1426). With this method of providing payments, electronic payment is provided seamlessly once confirmation of the shipment completion occurs. According to one embodiment, the CSIST framework includes a payment module that collects payment from the shipper for the shipment in advance of completion of the shipment. Once payment has been made, the processes of the shipment are complete, and method 1400 includes removing the shipment from the active shipments displayed on the carrier-view UI (block 1428). Method 1400 then ends.

Referring to FIG. 15, method 1500 begins at start block and proceeds to block 1502 which provides receiving and verifying the login credential information from the shipper. At block 1504 method includes presenting to each registered shipper a shipper-view UI that maps each in-route, recently completed, and scheduled shipments associated with that registered shipper. Then, method includes determining at decision block 1505 if a new shipment is being established. Assuming no entry is received for establishing a new shipment, method moves to block 1506, which provides detecting selection by a shipper of a particular shipment on the shipper-view UI. Method 1500 also includes opening a secondary window that provides additional details about the particular shipment, from among a description of the cargo, a destination of the shipment, shipping-related date and time information, an identifier and contact information of the carrier, and information about the equipment. Method 1500 then includes enabling communication with the carrier via the secondary window utilizing the contact information (block 1508).

Returning to block 1505, in response to receiving an entry identifying establishment of a new shipment by the shipper, while the shipper is logged into the shipper account, adding particulars of the shipment to one or more interfaces within the framework, including location maps that are presented to one or more carriers. Also, the shipment is added to and presented on the shipper view UI and carrier-view UI (block 1510). Method 1500 includes presenting the location of each available shipment within the operating-view UI (block 1512) and presenting interested carriers within shipper-view UI for shipper selection (block 1514). Finally, method 1500 includes generating a contract using terms and conditions associated with the particular shipper account and the particular shipment; presenting terms of the contract for review and acceptance by one or more carriers (block 1516). Method 1500 then ends.

In one embodiment, method 1500 also includes: in response to receiving an acceptance by one or more interested carriers, presenting each of the one or more interested carriers that match the carrier terms and requested carrier rating to the shipper for shipper selection of one of the interested carriers; and in response to receiving a selection of an interested carrier by the shipper, generating an electronic contract with the shipment terms and forwarding the electronic contract to the selected carrier for review and acceptance via the carrier-view UI.

CSIST framework 200 also provides a plurality of additional functions, including: in response to pick-up of a shipment by an equipment, tracking movement of the equipment via received movement data and presenting a current location of the equipment on the shipper-view UI until completion of the shipment. Additional functional items are presented herein as functions performed by CSIST framework to provide more expansive coverage of the framework operations. Accordingly, CSIST framework 200 provides the functionality of: publishing, for viewing by the carrier, at least one rule requiring carrier compliance during pickup and transportation of the shipment; confirming carrier compliance with the at least one pre-established rule during pickup and transportation of the shipment; and in response to the carrier complying with the at least one pre-established rule, providing at least one of: a higher remuneration for the shipment, a financial reward or tip to the carrier, and a completion credit/award that accumulates towards the carrier achieving a higher rating level. In one embodiment, method 1500 includes providing a push notification to the carrier to encourage carrier compliance with the at least one pre-established rule; and in response to the carrier being out of compliance with a pre-established rule, applying a penalty to a record of the carrier stored within the CSIST database.

According to one embodiment, CSIST framework 200 can also include the functionality of: receiving payment associated with a shipment and lodging the payment in a payment holding account; in response to a carrier accepting the shipment, tagging the shipment with carrier credential information and assigning the payment to the shipment; in response to receiving confirmation of a completion of the shipment, authorizing a release of payment for the shipment;

and in response to receiving an electronic request for payment from the carrier, processing payment to an account associated with the carrier, based on the carrier credential information.

According to another embodiment, CSIST framework 200 presents the functions of: presenting one or more shipping requests to a carrier that is logged into a carrier portal of the CSIST framework and who has an equipment located within the shipping zone of the one or more shipments; in response to receiving a selection of a first shipping request by the carrier, generating and displaying shipment data associated with the first shipping request; in response to receiving an acceptance of the shipment by the carrier, storing relevant shipment data corresponding to the shipment to an account of the carrier to enable the carrier of the selected equipment to locate the shipment, identify the best route for transporting the shipment from the pick-up point to the delivery point;

In yet another embodiment, CSIST framework 200 includes the functionality of: associating biometric data from the carrier to the carrier account; and enabling biometric verification of the carrier to enable the carrier to perform certain services and functions related to the shipment and the carrier account.

Additionally, as one aspect of the disclosure, CSIST framework 200 includes the additional features and functionality generally presented in block 2102 of method 2100 illustrated by FIG. 21, which method 2100 includes: establishing a shipper account within CSIST framework 200 based on shipper-provided information; establishing a communication with a tracking device on at least one of the cargo and the equipment, which enables tracking of the cargo while the equipment is in transit to the delivery point; enabling direct communication between both the portal and the shipper with the carrier via inputs entered into CSIST framework 200 and a mobile communication (MC) device of the carrier/driver. Additionally, CSIST framework 200 provides for enabling direct communication from the portal to the carrier via the MC device of the carrier;

With the above and other features, the present disclosure enables the revolutionizing of the cargo transportation market through the use of disruptive technology. Additionally, in one embodiment, the following features are included within the functionality provided via the technological improvements associated with CSIST framework 200, without limitation:

(i) Providing a portal for trucking companies and shippers to connect directly to allow for shipment assignment decisions to be optimized (i.e., Connect Cargo to Equipments);

(ii) Providing a platform that is more robust and secure than currently online methods (including a methodology and/or mechanism for vetting transportation providers and drivers);

(iii) Providing a background check for all drivers that sign up to receive an account;

(iv) Providing department of transportation (DOT) compliance information to each carrier; and (v) Providing additional/supplemental insurance liability to all participants as a benefit to the registered drivers. This additional insurance will be available to drivers and provides another revenue stream for TCIS.

Additionally, other features and functions enabled by CSIST framework 200 includes enabling:

(vi) tracking and updating of driver performance history and TCIS ranking, where a higher ranking could potentially earn the driver/carrier more pay and reward and more jobs/contracts;

(vii) providing a means to coordinate the pick-up and delivery within the desired limits established by the shipper; and (viii) increasing efficiencies and reduce wait times for the driver;

As generally provided above, additional functionality supported by CSIST framework 200 includes, without limitation:

(i) shippers are able to post their transportation needs and requirements to the CSIST portal (i.e., via an easily accessible, online web interface);

(ii) carriers/drivers are able to post their availability within a shared framework and seamlessly search for loads based on location and/or requirements, and other shipper or carrier criteria;

(iii) the CSIST framework 200 operates in the background to match shippers and carrier/driver with similar requirements;

(iv) shippers and drivers are able to easily negotiate pricing with all relevant information readily available within their UI to make an informed decision. Thus, once a connection is made, a price can be agreed to and a contract established between the shipper and the carrier, with CSIST framework 200 operating solely as a portal for electronic communication and exchange of information between the parties. In one embodiment, CSIST framework 200 establishes the specific rate based on an evaluation of all factors and criteria associated with the shipper, carrier, and shipment. Thus, no bartering between shipper and carrier is required to occur;

(v) CSIST framework 200 waits for all documents to be uploaded and generates prompts to ensure that the owners submit the required documents;

(vi) CSIST framework 200 collects the fee from the shipper at the time of the contract, via credit card, Pay-Pal®, wire transfer or electronic funds transfer (EFT), or other form of electronic funding. According to one embodiment, CSIST framework 200 places the driver portion of the fee into a holding account and waits for receipt of confirmation that the delivery has been completed; and (vii) CSIST framework 200 allows the shipper to track the shipment and provides status information about the shipment including, route being taken by the driver and ETA (expected time of arrival) of the shipment at the delivery/drop-off address.

Additionally, prior to departure of the carrier with the shipment, a trucking communication interface system (TCIS) module of CSIST framework 200 evaluates the carrier and his vehicle using data related to at least the following: location; capacity; availability; department of transportation (DOT) eligibility; desired delivery address/location; online payment; event management (e.g., traffic, mechanical issues, weather); contract (e.g., providing an electronically signed (e-sign) BOL); driver eligibility/compliance (weight, and number of driving hours).

Additional features supported by CSIST framework includes: capacity management; driver load brokering; payment processing; driver verification and background check; full feature i-Cargo load management; providing shipper direct equipment network access; providing a fully insured and bonded service; providing owner-carrier liability insurance to a negotiated amount; providing shipper loss liability insurance covered to a negotiated amount; real time tracking of carriers to identify which trucks are in the vicinity of the shipment and the size and type of equipment, as well as available capacity of the equipment; negotiated pricing that allows shipper to price the shipment and design aspects of the contract and BOL; and cargo verification and proof at a pick-up point and a drop-off point.

As previously stated, aspects of the disclosure enable the elimination of substantial portions of the broker 'fees' and overhead associated with each shipment. As another aspect, the carrier is plugged into a system that allows the driver/carrier to make available capacity known to potential shippers and thus turn the available capacity into a revenue generating shipping contract. Also, the system allows for capacity management by positions, weight, route of travel and drop-off location, as well as by owner/driver load brokering. As one of several security measures implemented as a part of the service, the carriers and their drivers are fully vetted and have to be compliant with the required state, federal, and CSIST regulations and requirements.

Generally, the various features of the disclosure provide support for the following applications: (a) small to medium transportation companies who rely on brokers for all or part of their volume (FTL and LTL); (b) large transportation providers looking for backhauls and volume where they have excess capacity; (c) owner-operator and other larger carriers looking to increase efficiency and avail themselves of rapid e-pay solutions; (d) LTL shippers looking for secured solutions; (e) shippers looking for lower cost solutions compared to the standard broker & agent model; and (f) shippers looking for secured transportation and/or real-time tracking and communication.

According to yet another aspect, CSIST framework 200 provides the functionality of: monitoring an environment within and surrounding the equipment, such as road and weather conditions, via one or more sensors; and evaluating and reporting on one or more condition affecting the shipment based on the monitored environment. This functionality is tied to a trucking communication interface system (TCIS) that includes CSIST framework at the backend and extends beyond CSIST framework to provide real-time communication with and monitoring/tracking of the carrier (and driver, if different from the carrier entity), the equipment, and the cargo.

Trucking Communication Interface System (TCIS)

FIG. 16 illustrates an example trucking communication interface system (TCIS) 1600 and/or TCIS network that extends from the CSIST framework 200 (i.e., the physical device (100) implementing CSIST framework 200) to enable efficient communication with carriers and monitoring and tracking of the carrier, the shipments/cargo, the equipment(s), and the environment around the equipment and/or the cargo, according to a plurality of embodiments. References to TCIS 1600 is understood to refer to the overall network shown in the figure, although specific functions or features of TCIS module 1610 can occasionally be referred to as functions or features provided by TCIS 1600 generally. It is also understood that several of these functions are ones provided within CSIST framework 200 via supporting modules within that framework (see FIG. 2). Referring to the figure, TCIS 1600 generally includes CSIST server 100 within which is provided TCIS module 250 and an associated TCIS carrier database 1615. TCIS database 1615 provides cloud storage 1610 for storing carrier and shipping data utilized by TCIS module 250 and/or CSIST framework 200. TCIS 1600 further includes shipper 1630, destination recipient 1670, and carrier financial account server 1680. Centrally located to these devices of functions of TCIS 1600 is carrier environment 1640 within which a carrier/driver functions. Carrier environment 1640 is shown subdivided into three sections, section A—account set up 1642, section B—in route communication and monitoring 1644, and section C—completed shipment reporting/payment 1648. Account set up 1642 can include use of a computer terminal with a web browser interface utilized to access a shipper and carrier access portal of CSIST framework 200. Additionally and/or alternatively, account set up 1642 can be completed by MC device 1660 of carrier 1646. As shown carrier 1646 and his MC device 1660 are co-located with the equipment, illustrated as a truck 1650. Within MC device 1660 is TCIS app 1661, which executes locally on MC device 6060 to provide and/or support some of the monitoring, rulers alerting, SOS triggering, and other communication functions described herein. One aspect of the disclosure provides a web access interface that can be generated by TCIS app 1661 supported by a module executing within the CSIST framework 200 and/or a TCIS server. The web access interface enables entry and/or retrieval of at least the following data and features: customer purchase order (PO) details; carrier/driver details; bill of laden (BOL), manifest, etc. Equipment/truck 1650 includes a mobile hotspot 1658 and/or one or more access points 1666 that enables communication from equipment/truck 1650 back to CSIST server 100. Equipment/truck 1650 is shown with a trailer that includes shipment 1652, other shipments 1654, and an available shipping space 1656. As describe herein, available shipping space is an asset that can be tracked and utilized to determine what other shipments can be assigned to the equipment/carrier to allow for greater utilization of shipping capacity and by extension a greater value use of the equipment. A shipper needing a smaller package shipped does not have to acquire an entire equipment for the small package, but can instead piggy back on an equipment travelling towards the general delivery location with other cargo on board. Likewise, the carrier is able to more efficiently utilize his equipment to provide full loads (made up of several smaller loads), particularly on long hauls and/or hauls with greater opportunity costs.

Additionally trailer is equipped with one or more sensors 1662, which enables the sensing/detect in/report in of environmental conditions both inside the trailer and surrounding the truck 1650 while the shipment is in progress. In addition, a particular shipment 1652 may also have its own sensor 1664 attached to the exterior or interior of the case or packaging for that shipment 1652. According to one or more embodiments, data is accumulated from a plurality of sensors, which can be provided at various locations within or on or underneath the equipment and/or may be provided with a specific shipment, and the sensed data is transmitted back to CSIST server 100. In one embodiment, all of the sensitive data is forwarded to a single collection point within equipment 1650, and the collected data is compiled utilizing a proprietary compilation method and forwarded via a proprietary protocol for processing via TCIS module 250. These sensors 1662 and 1664 sense or capture different characteristics associated with the shipment, including but not limited to: real time positioning; alternate routes; recovery; cargo environment, such as temperature and humidity; event occurrence; motion, intrusion, and other activities affecting cargo; real time or cloud video. In one embodiment, sensed data can be utilized to determine estimated time of arrival (ETA) of the cargo/equipment at the delivery address, which may be deduced based on road conditions and other received data from available sources, such as traffic reports.

In one or more embodiments, tracking of the shipment can be performed utilizing a third party server, such as the ITRAN service, for example. As a paid for application, use of the tracking features can be added on to the base TCIS module as an additional service offered and/or a premium offering. Additionally, security features can be provided that includes one or more of temperature monitoring, door lock monitoring with/without remote locking, and on-board video monitoring. These features can be provided as add-ons with an associated service costs payable when added to the base service.

TCIS app 1661 also facilitates the process that occurs during shipment pick up, delivery, and drop off. Among the functions that are enabled by use of TCIS app 1661 on MC device 1660 during the shipment loading process, are the following: DDI data capture (e.g., taking and storing a picture of the DDI); Seal of the shipment container (e.g., taking and storing a picture of the seal; Locked closed (e.g., detecting a closed position of an electronic lock via Bluetooth, NFC, or other close communication mechanisms); departure—LBS; and ETA updates, which provides the shipper (and recipient) with regular updates to increase efficiency and reduce driver wait times.

Additionally, while the shipment is in transit, additional TCIS features and/or functions supported by the use of sensors 1662 and 1664 along with TCIS app 1661 and MC device 1660 includes: visibility/location—LBS; temperature monitoring/detection (utilizing a Wi-Fi embedded temperature reading device); ETA—LBS updates; providing pre-arrival alert, such as by the using an LBS geo-fence; pick up and drop off efficiency (reducing driver wait time); event notification, for events such as security, mechanical issues, temperature; route management (e.g., via Waze); rules enforcement and/or security (e.g., implementing a stop policy and/or a redzone policy); providing mechanical updates; providing weather updates; tracking and providing traffic events, such as accidents and/or delays.

As one aspect, the shipment tracking user interfaces of CSIST framework also provide various types of information about the carriers and shipping routes to facilitate shipper selection of specific carriers for transporting specific shipments, using a selection process for identifying and selecting a best equipment for a particular shipment based on the carrier profiles and other received external inputs, including travel conditions, delivery/drop-off time, and others, according to one or more embodiments.

Additional aspects of the TCIS service include: (i) efficient payment processing, providing the capability for the carrier to receive payment quickly upon having a clean POD; (ii) driver verification, background check and DoT compliance; (iii) integrated cargo security capable with iCargo system; (iv) route management and ETA—utilizing crowd sourced information; and (v) event management alerts in near real time; TCIS 1600 also includes a voice and data communication network 1620 that can have one or more wireless networks (RAN) 1625 and or more access points 1629 included therein. As shown, the wireless network 1625 includes an antenna 1626, and a base station controller, eNodeB 1627 and radio network controller (RNC) 1628. Voice and data communication network 1620 enable voice and data information exchange 1664 generally represented by a dashed box. A communication path 1621 is established/supported between CSIST server 100 and shipper 1630, a next communication path 1622 between CSIST server 100 and carrier financial account server 1680, and a third communication path 1623 is established between MC device 1660 and CSIST server 100. A separate communication path 1624 is also established between shipper and equipment 1650, which may include a communication line to MC device 1660 of carrier/driver 1646. A communication path may also be established between the recipient at destination 1670 and one or more of the other parties to the shipment, i.e., shipper 1630 or carrier/driver 1646.

The exchange of information occurs virtually via the communication network 1620 and completion of negotiations and contract execution occurs as a virtual handshake 1605 within the cloud. An example data processing system that operates as the TCIS server (within a server network) provides the cloud infrastructure supporting TCIS and the seamless communication between the carrier and shipper, according to one or more embodiments.

TCIS 1600 also presents a global positioning satellite 1675 as one possible location detection service that can be utilized to track and identify an exact location of a equipment 1650 and/or a carrier/driver 1646 via his/her MC device 1660. Similarly, GPS 1675 can also be utilized to track a specific shipment, e.g., shipment 1652 via an on-shipment sensor 1664.

As one additional aspect to TCIS 1600 carrier financial accounts 1680 is registered with framework 200, which serves as an intermediary for payment transfer from shipper 1632 and carrier account within carrier financial accounts 1680. Thus, as illustrated by the above briefly-described figures, TCIS 1600 includes and/or offers user device apps, location based services, and a payment processing services to link drivers and shippers, and enable contracting for shipping services.

Figure 17:
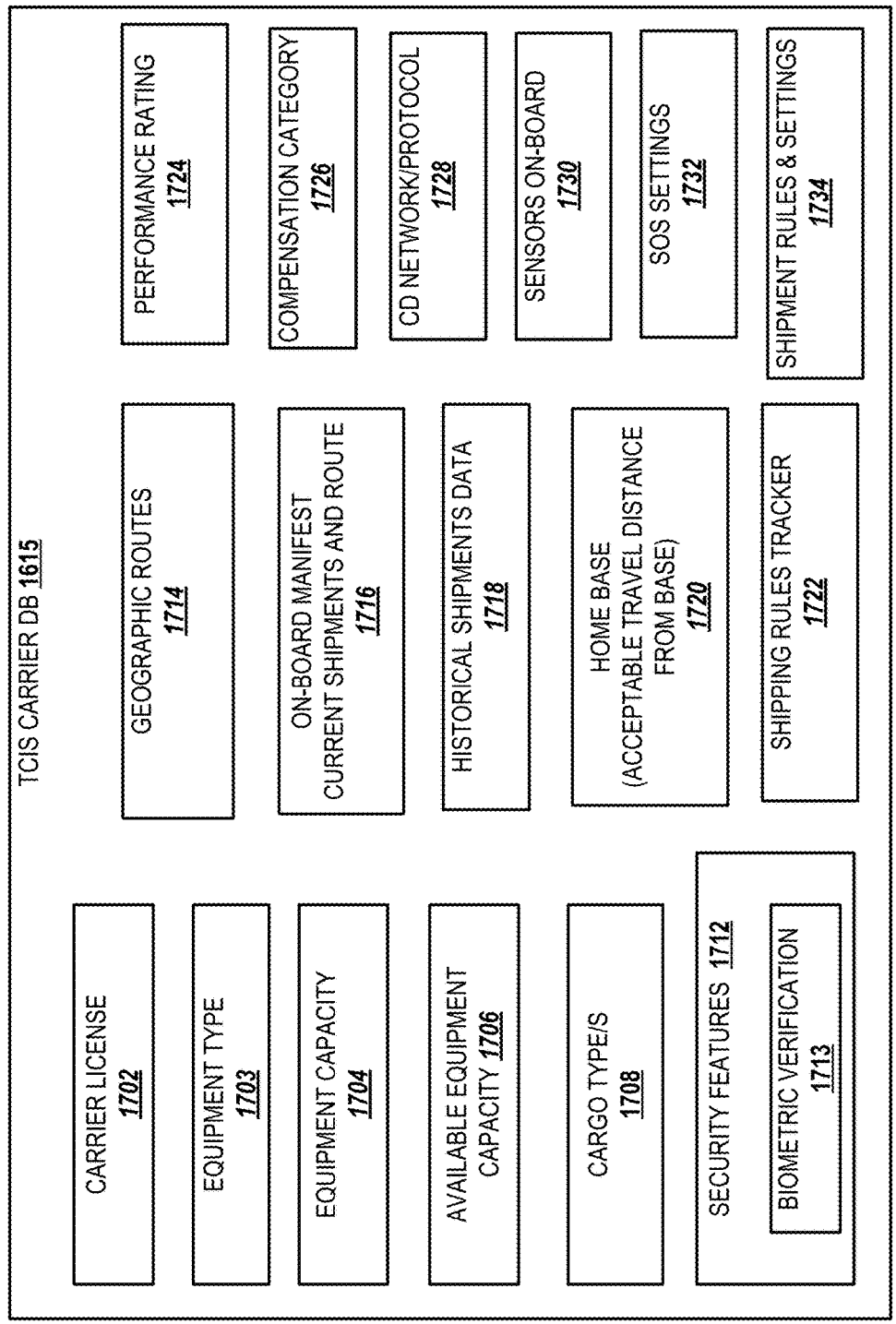
FIG. 17 provides a block diagram representation of various data that can be maintained within a carrier database utilized by the TCIS and CSIST framework to support carrier-side tracking and communication, in accordance with one or more embodiments.

Referring now to FIG. 17, there is illustrated an example TCIS carrier database 1615 and specifically some of the internal components and/or data contained therein. TCIS carrier database 1615 includes carrier license 1702, equipment type 1703, equipment capacity 1704, available equipment capacity 1706, cargo types 1708 for equipment. TCIS carrier database 1615 further includes security features 1712 within which barometric verification 1713 is included. Among the other modules/data on geographic routes 1714 onboard manifest 1716, which provides the current shipments and routes and destination, historical shipments data 1718, and home base location 1720, which can include an acceptable travel distance from a home base. Additionally, TCIS carrier database 1615 includes shipping rules tracker 1722, performance rating 1724, compensation category 1726, MC device's network/protocol 1728, onboard sensors 1730, SOS settings 1732, and shipment rules 1734. Each of these data modules provide specific functionality associated with the execution of TCIS 1600 and or running of application on MC device 1800 (described hereafter).

FIG. 18 illustrates an example mobile communication (MC) device of a carrier complete with functional components and features that provide a user interface that enables routing data and other information relevant to a shipment to be exchanged between the carrier and the CSIST framework within TCIS network, according to one embodiment. Specifically, FIG. 18 depicts a block diagram representation of the component makeup of a mobile communication (MC) device operating within a communication network and serving as the electronic device within which the various features of the disclosure can be implemented. According to the general illustration, MC device 1800 is a communication device that is designed to communicate with other devices via one of a wireless communication network 1625 (FIG. 16) generally represented by base station, evolution node B (eNodeB) 1627 and antenna 1626. MC device 1800 can be one of a host of different types of devices, including but not limited to, a mobile cellular phone or smart-phone, a laptop, a net-book, an ultra-book, and/or a tablet (e.g., an iPAD®), or other computing device with access to wireless connectivity. The utilized devices includes the necessary hardware and software to enable wireless-enabled communication between MC device 1800 and a network, which supports the information, data, and voice communication required to implement the various features described herein to facilitate shipping of cargo via the general CSIST framework 200 and TCIS 1600.

Referring now to the specific component makeup and the associated functionality of the presented components, MC device 1800 comprises processor 1810, which connects via a plurality of interconnects (illustrated by the bi-directional arrows) to a plurality of other functional components of MC device 1800. Processor 1810 can be an integrated circuit that includes one or more programmable microprocessors and a digital signal processor (DSP). Processor 1810 controls the communication, program code execution, power mode control, time synchronization, and other functions and/or operations of MC device 1800. These functions and/or operations thus include, but are not limited to, application data processing and signal processing.

Connected to processor 1810 is storage 1815, memory 1820, input/output (I/O) devices 1840 and communication mechanisms 1855. Memory 1820 can include volatile memory and/or non-volatile memory. During device operation, one or more executable applications can be stored within memory 1820 for execution by processor 1810. For example, memory 1820 is illustrated containing TCIS Local APP 1822, which is a local application or utility that executes on MC device 1800. APP 1822 includes user interface (UI) 1824 and TCIS (credential) setup/access user interface utility 1826, which is utilized to provide an access portal to CSIST framework 200. Once access to CSIST framework 200 is established, user interface 1824 enables presentation of carrier-view UIs 1805 and 1807 illustrated to the right within the three dimensional view of MC device 1800. Memory 1820 further includes mapping and location utility 1828, which can provide access to available maps and which utilizes a GPS sensor or other location detection sensor or function of MC device to report an exact location of MC device 1800 back to CSIST framework 200. In normal operation, the carrier has possession of MC device 1800 and either the carrier and/or MC device are typically within close proximity to the carrier's equipment on which a shipment has been loaded. In one or more embodiments, additional tracking features are provided within the equipment and/or the shipment that allow for CSIST framework 200 to identify, in real time, when the carrier and/or MC device 1800 moves out of an acceptable range away from the shipment or equipment.

Memory 1820 also includes shipment confirmation utility 1830. Further, memory 1820 also includes biometric verification module 1832 that allows for biometric confirmation of a carrier before providing access to certain features or functions on/to at least one of MC device 1800, on-board shipment, equipment lock override, CSIST carrier account, etc. As an example, a voice or fingerprint confirmation may be required before allowing a carrier/driver to pick up a high value shipment, so that only a specific pre-authorized carrier can perform the transportation of that shipment. Thus, for example, a department of defense (DOD) shipment will be released only to a DOD cleared carrier. Biometric verification module 1832 can include a voice input comparator and/or be associated with a fingerprint scanner/reader. The functionality associated with and/or usage of each of the software modules will become evident by the descriptions provided herein. It is appreciated that the various software modules can be independent modules that communicate with each other via processor execution of respective program code.

Memory 1820 also includes panic button (SOS) utility/module 1834, speed safety early warning module 1836, and rules tracking module 1838. Panic button (SOS) utility/module 1834 generates an SOS or panic button (not shown) on user interface 1824. Selection of the panic button by the carrier triggers a dynamic notification procedure whereby a signal is sent to all registered carriers within a particular radius of the equipment/carrier. That signal is a predefined signal that requests all receiving carriers perform one or more actions. Among these actions can be a request to call 911 and/or the local authorities. As one aspect, TCIS 1600 operates in the background and monitors each of the carriers' MC devices to determine which ones have responded to the received SOS signal. TCIS 1600 then transmits to the requesting carrier's MC device 1800 periodic updates that indicate the number of active operated devices that receive the SOS signal, the number of devices that subsequently called 911, and/or other information that can be utilized by the carrier.

Speed safety early warning module 1836 allows a carrier to provide to other carriers within a certain radius of the MC device a notification of traffic conditions and/or road conditions and/or other conditions that may necessitate the other carriers reduce and/or control their speed or otherwise be mindful of situations in the area. Rules tracking module 1838 presents a series and or sequence of visible icons identifying specific rules that must be followed by the carrier during the shipment. In at least one embodiment, these rules are pre-established rules of the CSIST framework 200 and are monitored by the CSIST framework 200. A rules tracking engine at the CSIST framework 200 can provide advance notification to the carrier when and/or if the carrier has not followed a specific rule that is required. This advance notification provides the carrier an opportunity to correct his performance before the rule is identified as being broken. In one embodiment, the rules are required to be followed in a particular order. The carrier profile and/or awards allocation for completion of shipments can be tied to the completion of all rules. Thus a shipper who always follows the rules established by the framework, can have his rating level be more quickly elevated by being provided additional awards for each successful shipment completion, without breaking any of the pre-establish rules.

Referring again to the figure, storage 1815 can be any type of available storage device capable of storing one or more application software, firmware, and data. It is further appreciated that in one or more alternate embodiments, the device storage can actually be or can include remote storage, such as a cloud storage, and not necessarily be fully integrated within the device itself. As provided, storage 1815 contains a personalized copy of TCIS local database 1615 that can include some of the carrier login credential and biometric information to allow for local processing of the carrier's login to CSIST framework, in one or more embodiments. Storage can also include a database of specific contacts and device settings associated with the particular subscriber.

MC device 1800 also comprises a plurality of input/output (I/O) devices 1840, including, as input devices, camera 1842, microphone 1844, touch screen and/or touch pad and/or keypad 1846, and biometric sensor 1852, and, as output devices, display 1848 and speaker 1850, and others. MC device 1800 can also include a subscriber identification module (SIM) or other similar feature that provides unique identification information of the carrier that owns or utilizes MC device 1800. In order to allow MC device 1800 to synchronize operations and/or provide time data, MC device 1800 also includes system clock (not shown).

According to one aspect of the disclosure and as illustrated by FIG. 18, MC device 1800 supports at least one and potentially many forms of wireless, over-the-air communication, which allows MC device 1800 to transmit and receive communication with at least one second device and/or an externally located network. To support wireless communication, MC device 1800 includes one or more of the following communication components: wireless network communication module 1860 (which can include a transceiver with connected antenna, both not expressly provided), near field communication (NFC) transceiver module 1862, wireless fidelity (WiFi) module 1864, and Bluetooth® transceiver 1866. It is appreciated that MC device 1800 can also include components for wired communication, such as modem and Ethernet modules (not shown). Collectively, these wireless and wired components provide a communication means or mechanism 1855 by which MC device 1800 can communicate with other devices and networks. To enable location-based services within/on the device, MC device 1800 also includes a location service module, such as a GPS module, without limitation.

MC device 1800 establishes communication with the at least one other device via over-the-air signal transmission, following the exchange of specific authentication and/or access credentials. The communication between MC device 1800 and the second devices can be via near field communication, Bluetooth, infrared (IR) transmission, and others, without limitation. As a wireless device, MC device 1800 can transmit data over a wireless network (e.g., a Wi-Fi network, cellular network, Bluetooth® network (including Bluetooth® low energy (BLE) networks), a wireless ad hoc network (WANET), or personal area network (PAN)). In one embodiment, MC device 1800 may be further equipped with an infrared (IR) device (not pictured) for communicating with other devices using an IR connection. In another embodiment, MC device 1800 may include a short-range wireless device, including, but not limited to, a near field communication (NFC) device. In still another embodiment, MC device 1800 may communicate with one or more other device(s) using a wired or wireless USB connection.

With the use of the above-described MC device 1800, additional aspects of the disclosure provide an application or module that can be executed on a personal user device (PUD), such as a smartphone, tablet, or similar electronic device. The PUD includes a user interface and a processor communicatively connected to the user interface and which controls the content provided via the user interface. The PUD includes an application module, which can be stored on a local storage device. When executed by a processor of the PUD, the application module enables the PUD to provide and/or support the following features and functionality, without limitation: self-dispatch (RMO) and route monitoring; entry of driver DDI details; departure documents upload; picture/image capture; real time positioning; alternate routes determination; event assistance, localized speed safety control; driver in cab notification; rest stop monitoring; central control center; panic 'button' security feature (or SOS); two way communication via hands free operating mode; and cargo/truck ETA.

Figure 22:
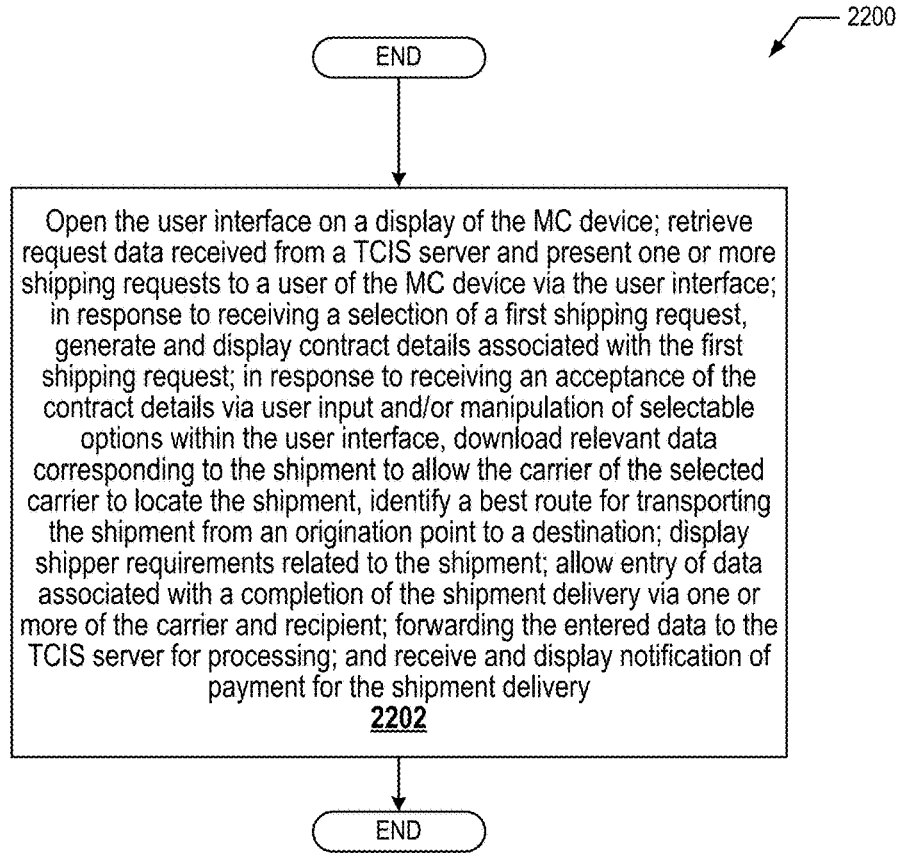

As presented above, as one aspect of the disclosure, a user mobile communication (MC) device 1800 is provided having: a user interface 1824; a processor 1810 coupled to the user interface 1824 and controlling content provided via the user interface 1824; and a TCIS user module (1822) executing on the processor to cause the processor 1820 to perform the method 2200 of FIG. 22. The processes of method 2200 are generally provided within block 2202 which provides: opening the user interface on a display of the MC device; retrieving shipping request data that is received from a TCIS server and present one or more shipping requests to a user of the MC device via the user interface; in response to receiving a selection of a first shipping request, generating and displaying contract details associated with the first shipping request; in response to receiving an acceptance of the contract details via user input and/or manipulation of selectable options within the user interface, downloading relevant data corresponding to the shipment to allow the carrier of the selected equipment to locate the shipment, identify a best route for transporting the shipment from a pick-up point to a delivery/drop-off point; displaying shipper requirements related to the shipment; allowing entry of data associated with a completion of the shipment delivery via one or more of the carrier and recipient; forwarding the entered data to the TCIS server for processing; and receiving and displaying notification of payment for the shipment delivery. In one embodiment, the carrier's mobile device is equipped with biometric scanners or other biometric input devices, and the carrier is able to communicate with the TCIS server and/or perform certain services or functions related to the shipment. In another embodiment, the carrier is able to access the TCIS system (and/or personalized carrier-side UI at the CSIST framework 200) only after biometric verification of the carrier at both the mobile device and the TCIS server.

Figure 23:
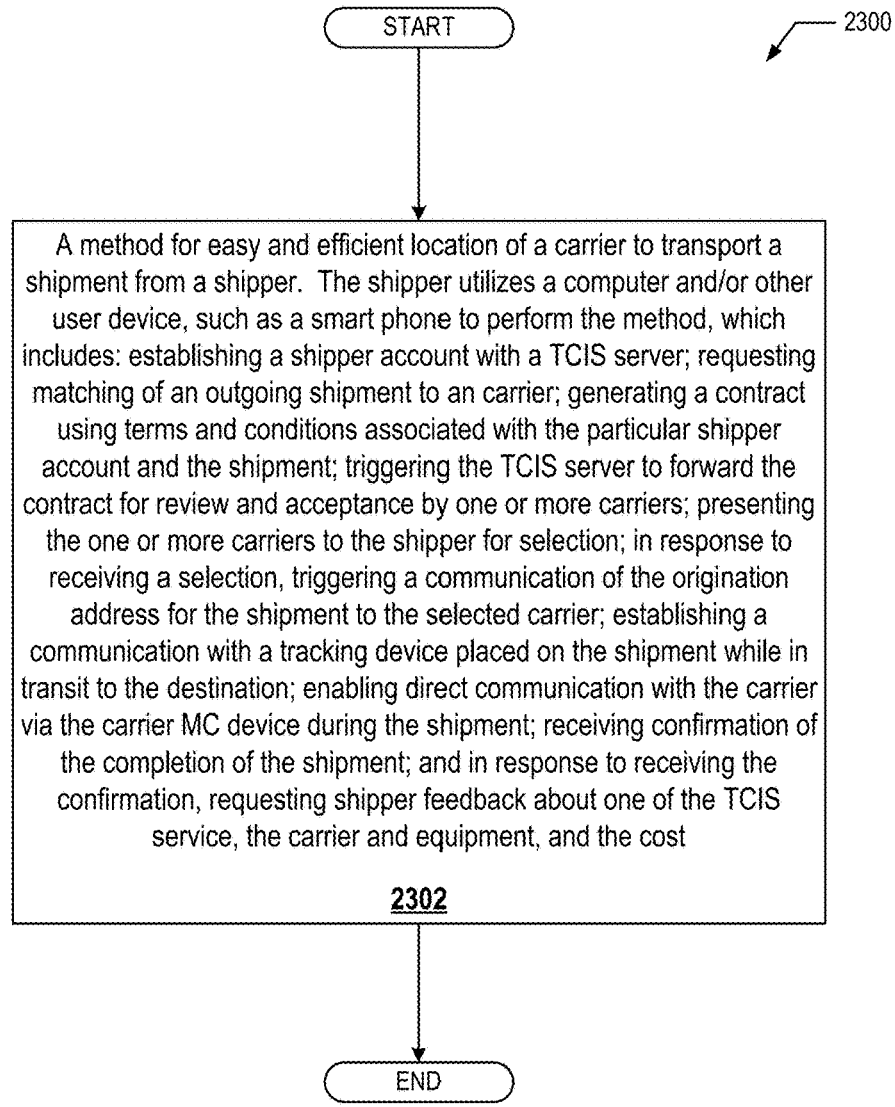

As presented herein, one aspect of the overall disclosure provides a method for easy and efficient location of a carrier to transport a shipment from a shipper. In one embodiment, the shipper utilizes a computer and/or other user device, such as a smart phone to perform the method. FIG. 23 presents a flow diagram representation of method 2300, in which the features and functionality are presented within block 2302 and include: establishing a shipper account with a TCIS server; requesting matching of an outgoing shipment to a carrier; generating a contract using terms and conditions associated with the particular shipper account and the shipment; triggering the TCIS server to forward the contract for review and acceptance by one or more carriers; presenting the one or more carriers to the shipper for selection; in response to receiving a selection, triggering a communication of the pick-up address for the shipment to the selected carrier; establishing a communication with a tracking device placed on the shipment while in transit to the delivery/drop-off address; enabling direct communication with the carrier via the carrier MC device during the shipment; receiving confirmation of the completion of the shipment; and in response to receiving the confirmation, requesting shipper feedback about one of the TCIS service, the carrier and equipment, and the cost. In one or more embodiments, a second sensor is provided on the equipment to enable the TCIS system and/or shipper to monitor the environment surrounding the trailer, such as road and weather conditions. Use of available global position system (GPS) devices and service and other available environmental monitoring agents are also supported.

Motivation for the innovations described herein includes a recognition by the innovator/s that there currently exists a number of inefficiencies and waste of resource in the trucking industry (or truck brokerage industry today), which relies on broker boards and individual brokers and agents coordinating transportation with their clients using the broker's network of trucking companies. Among the inefficiencies with the current models are the following: (i) there is a tremendous amount of waste as trucks capacity and/or utilization is not optimized; (ii) drivers/carriers often drive hundreds of miles empty; (iii) drivers frequently wait for days at a time for shipments and depend on a broker to contact them to see if they are available (i.e., there is no way to let the broker know the driver is available unless the driver calls the broker directly); and (iv) shippers have little visibility into the transportation process and many times cargo is not transported directly to the delivery/drop-off point as the carrier/driver has little accountability once he/she leaves with the cargo (the transportation of the cargo occurs as a black hole for the shipper once the shipment leaves the shipment pick-up point). The first three inefficiencies affect small, medium and large carriers, but are more financial damaging to the small and medium carriers (i.e., carriers owning less than 5 trucks), which are a significant percentage of the available trucking market. Aspects of the present disclosure enable these carriers and in particular the drivers of the trucks to spend more time having shipments onboard and thus make more money. Additionally, as one important aspect of this disclosure, the carriers and/or drivers also get paid faster than with traditional systems. Additional benefits of the disclosure includes, but are not limited to the following:

(i) the CSIST framework/TCIS provides security and tracking in a current unsecure space (i.e., as one aspect, TCIS implements a security protocol to ensure that the shipment is secure as well as the communication between the shipper and carrier);

(ii) the CSIST framework/TCIS system broadens the current supply base market (and help cargo carriers seamlessly eliminate the deadhead by connecting the cargo directly to the carrier's equipment);

(iii) the CSIST framework/TCIS provides dedicated FTL and LTL. This model works for both by filling a truck or a pallet space depending on need;

(iv) the CSIST framework/TCIS replaces brokerage and agent markets and in the process reduces the overhead cost on shipments; and (iv) by using the CSIST framework/TCIS, owner carriers can become or acts as LTL specialists, motivating the carrier to become more efficient and financially more successfully.

Further, one aspect of the disclosure involves the recognition that the conventional paper-based system is inefficient. Thus, one significant benefit of the TCIS system involves the payment process for completed deliveries. The TCIS module includes a module that: provides a means for payment to be exchanged real-time; enables shippers to pay when the load is scheduled and a driver is contracted to the load; enables the driver to receive payment as soon as the shipment is delivered and the POD is confirmed. According to one embodiment, the payment process is completed via the user application executing on the user's MC device. This direct payment process allows for the elimination of the traditional broker fees, which can be substantial and are charged per shipment. Once the shipment is delivered the driver uploads the POD electronically via this MC device and TCIS retrieves and forwards the driver portion of the fees as payment into the payment account established by the driver. In one embodiment, the payment of the driver portion from the holding account is completed only after the recipient of the shipment confirms that the shipment arrived without damage and/or some other pre-established criteria is met.

As further described below, implementation of the functional features of the disclosure described herein can involve use of a combination of hardware, firmware, as well as several software-level constructs (e.g., program code and/or program instructions and/or pseudo-code) that execute to provide a process that provides the services and features of the above described CSIST framework and TCIS network.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

The description of the illustrative embodiments can therefore be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein. Those of ordinary skill in the art will appreciate that the basic configurations depicted in the figures may vary. The illustrative components are not intended to be exhaustive, but rather are representative to highlight essential components that are utilized to implement aspects of the described embodiments. For example, other devices/components/features may be used in addition to or in place of the ones depicted and/or described. The depicted example is not meant to imply design, usage, or other limitations with respect to the presently described embodiments and/or the general innovation.

In the above description, exemplary embodiments in which various aspects of the disclosure may be practiced are described in sufficient detail to enable those skilled in the art to practice the invention. It is to be understood that other embodiments may be utilized and that logical, architectural, programmatic, mechanical, electrical and other changes may be made without departing from the spirit or scope of the present disclosure. The above description is an extended summary and therefore, should not to be taken in a limiting sense, and the scope of the present disclosure will be defined by appended claims and equivalents thereof.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the invention not be limited to the particular embodiments disclosed for carrying out the disclosure, but that the disclosure will include all embodiments falling within the scope of any appended claims. Moreover, the use of the terms first, second, etc. do not denote any order or importance, but rather the terms first, second, etc. are used to distinguish one element from another.

What is claimed is:

1. A computer-implemented method comprising:
receiving a first input from a carrier that includes at least one of a desired staring point and a desired end destination of an equipment of the carrier, the equipment capable of transporting a shipment from a shipment pick-up point to a shipment delivery point;
a processor locating at least one available shipment having at least one of (i) a shipment pick-up point within a pre-established, shipment pick-up zone corresponding to an acceptable radius around the desired starting point location and (ii) a shipment delivery point within an acceptable shipment drop-off zone of the desired end destination, wherein the shipment pick-up point can be a different location from the desired starting point and a current location of the equipment and the shipment delivery point can be a different location from the desired end destination;
the processor dynamically determining and mapping an optimal route for delivery of each of the at least one available shipment from a respective, corresponding shipment pick-up point to a respective, corresponding shipment delivery point;
generating and displaying an available shipments (AV) user interface (UI), and plotting, on the AV UI, a complete route for the equipment from the desired starting point to the desired end destination, the route including a first path from the desired starting point to the shipment pick-up point, at least one middle path including the optimal route for the corresponding shipment, and a third path from the shipment delivery point to the desired end destination; and
calculating and providing, to the carrier, via the AV UI, an opportunity cost of the shipment along that complete route, based in part on a total number of empty miles associated with at least one of the first path and the second path.

2. The method of claim 1, further comprising:
receiving login credential information from the carrier at a login portal of a carrier and shipper interfacing and shipment tracking (CSIST) framework hosted on a device having the processor, which is coupled to a network interface device (NID) for communicating with remotely-connected user devices utilized by one or more shippers and one or more carriers, the processor communicatively coupled to an CSIST database;

in response to verifying the login credential information, providing access by the carrier to a carrier-view user interface (UI);

the processor presenting, within the carrier-view UI, a location of each of the at least one available shipment; and providing, for each available shipment, additional details associated with that shipment including the total number of empty miles and a price being offered by an associated shipper for completion of the shipment, wherein the opportunity cost for each shipment is determined based on both the number of empty miles and the price.

3. The method of claim 2, further comprising:

in response to receiving an input for a list view of the available shipments, the processor presenting a second carrier-view UI listing each of the available shipments along with an associated opportunity cost for each available shipment, wherein a ranked listing of the available shipments can be triggered by one of a user selection or a default setting of the second carrier-view UI.

4. The method of claim 2, wherein the first input is a shipment request, the method further comprising:

identifying a rating level of the carrier, wherein each carrier is assigned a rating ranging from a lowest, initial tier rating to a highest tier rating achieved based on certain pre-set criteria and historical performance; and presenting as available shipments within the carrier-view UI, only shipments falling at or below a current rating level of the carrier, wherein the carrier is unable to view or select shipments intended to be assigned to carriers falling within a higher rating level than the current rating level of carrier.

5. The method of claim 2, further comprising:

tracking each shipment completed by the carrier;

receiving inputs corresponding to one or more metrics being measured to determine successful completion of the shipment by the carrier;

evaluating, based on the received inputs, whether the carrier successfully met all of one or more measured metrics;

in response to the carrier successfully meeting all of the measured metrics, providing an award that is registered within a carrier profile maintained within the CSIST database.

6. The method of claim 2, further comprising:

identifying when a total number of awards earned by the carrier reaches a next award threshold corresponding to attainment of a next rating level; and in response to the total number of awards earned reaching the next award threshold, elevating the carrier to a next rating level, wherein the carrier becomes eligible to view additional available shipments that are restricted to being viewable only on carrier-view UIs of carriers within the next rating level, wherein the additional available shipments include higher value shipments.

7. The method of claim 1, further comprising:

evaluating one or more characteristics of the equipment relative to established equipment requirements for each cargo that is determined to be an available shipment; and filtering out from the displayed available shipments any shipments of cargo having an established equipment requirement that cannot be met by the equipment, wherein only cargo whose established equipment requirements are met by the equipment are presented within the carrier-view UI as available shipments, irrespective of a carrier rating.

8. The method of claim 1, further comprising:

in response to receiving a request from a registered shipper to locate an equipment-carrier to transport a shipment, the request being received at the CSIST framework:

identifying whether at least one qualified pairing of carrier and equipment are available from among all qualified carriers and equipments registered with the CSIST framework, wherein the carrier and equipment are available when located within a shipment pick-up zone and are a qualified pairing when the carrier meets a minimum rating level for desired carriers and the carrier's equipment meets the established equipment requirements for the equipments of the cargo being shipped;

compiling shipment details and providing the shipment details for presentation within a corresponding carrier-view UI for each qualified carrier associated with one of the at least one qualified pairing;

enabling bi-directional negotiating of shipping particulars, including pricing, for the shipment between the registered shipper and the qualified carriers;

in response to completion of the negotiation and an acceptance of negotiated terms between the shipper and a carrier selected by the shipper, generating a contractual agreement for acceptance by the carrier within the carrier-view UI; and associating the negotiated terms of the contractual agreement with the shipment and storing the negotiated terms and shipment details within a data module of the CSIST framework that is available for future viewing by both the carrier and the shipper.

9. The method of claim 1, further comprising:

presenting to each registered shipper a shipper-view UI that maps each in-route, recently completed, and scheduled shipments associated with that registered shipper; and in response to pick-up of a shipment by an equipment, tracking movement of the equipment via received movement data and presenting a current location of the equipment on the shipper-view UI until completion of the shipment;

in response to selection by a shipper of a particular shipment on the shipper-view UI:

opening a secondary window that provides additional details about the particular shipment, from among a description of the cargo, a destination of the shipment, shipping-related date and time information, an identifier and contact information of the carrier, and information about the equipment; and enabling communication with the carrier via the secondary window utilizing the contact information.

10. The method of claim 1, further comprising:

initiating a tracking protocol to dynamically track an equipment of a shipment following pick-up of the cargo at the pick-up point;

updating the shipper UI as the equipment moves with the shipment;

terminating the tracking protocol following successful completion of the shipment, wherein the processor removes the equipment signal from the shipper-view UI; and moving the shipment to a completed status within the shipper-view UI.

11. The method of claim 1, further comprising:
receiving secondary verification as evidence that a shipment has been successfully delivered to the delivery point;
in response to receiving the secondary verification, triggering an electronic payment of the carrier for completion of the shipment;
wherein electronic payment is provided seamlessly once confirmation of the shipment completion occurs, and the CSIST framework includes a payment module that collects payment from the shipper for the shipment in advance of completion of the shipment; and
presenting confirmation of a transfer of electronic payment to the carrier via at least one of the carrier-view UI and a communication device of the carrier.

12. The method of claim 1, further comprising:
publishing, for viewing by the carrier, at least one rule requiring carrier compliance during pickup and transportation of the shipment;
confirming carrier compliance with the at least one pre-established rules during pickup and transportation of the shipment; and
in response to the carrier complying with the at least one pre-established rules, providing at least one of: a higher remuneration for the shipment, a financial reward or tip to the carrier, and a completion credit/award that accumulates towards the carrier achieving a higher rating level.

13. The method of claim 12, further comprising:
providing a push notification to the carrier to encourage carrier compliance with the at least one pre-established rule; and
in response to the carrier being out of compliance with a pre-established rule, applying a penalty to a record of the carrier stored within the CSIST database.

14. The method of claim 1, further comprising:
receiving from a carrier a first set of credential information that identifies relevant personal and professional data associated with the carrier;
initiating a background check of the carrier utilizing the first set of credential information;
evaluating a suitability of the carrier to be affiliated with the CSIST framework for possible selection to transport shipments;
in response to determining the carrier is a suitable candidate for inclusion in a CSIST carrier group, assigning an initial rating level to the carrier;
establishing an initial fee rate for the carrier for use during a an initial trial period; and
in response to the carrier successfully completing one or more shipments, modifying the initial rating level and the initial fee rate, based on a determined service level of the carrier.

15. The method of claim 14, wherein modifying the initial rating level and initial fee rate comprises:
receiving feedback from one or more of the shipper and a recipient of cargo from one or more shipments completed by the carrier; and
comparing shipping data related to the shipment, including data from among length of time to complete shipment, route taken, responsiveness of the carrier, timing for submission of documentation, safety considerations, speed of travelled relative to known speed limits, and comparative data of other shipments along similar routes.

16. The method of claim 14, further comprising:
receiving confirmation of the receipt/delivery of the shipment at the delivery point;
recording delivery statistics utilized to rate a service level of the carrier; and
updating the service level within a profile associated with the carrier, wherein the service level is utilized to rate the carrier relative to other carriers and for future selections and/or assignment of shipping contracts, and wherein the service level can be utilized by a shipper to select from among multiple available carriers.

17. The method of claim 1, further comprising:
receiving payment associated with a shipment and lodging the payment in a payment holding account;
in response to a carrier accepting the shipment, tagging the shipment with carrier credential information and assigning the payment to the shipment;
in response to receiving confirmation of a completion of the shipment, authorizing release of payment for the shipment; and
in response to receiving an electronic request for payment from the carrier, processing payment to an account associated with the carrier, based on the carrier credential information.

18. The method of claim 1, further comprising:
presenting one or more shipping requests to a carrier that is logged into a carrier portal of the CSIST framework and who has an equipment located within the shipping zone of the one or more shipments;
in response to receiving a selection of a first shipping request by the carrier, generating and displaying shipment data associated with the first shipping request; and
in response to receiving an acceptance of the shipment by the carrier, storing relevant shipment data corresponding to the shipment to an account of the carrier to enable the carrier of the selected equipment to locate the shipment, identify the best route for transporting the shipment from the pick-up point to the delivery point.

19. The method of claim 1, further comprising:
associating biometric data from the carrier within the carrier account; and
enabling biometric verification of the carrier to enable the carrier to perform certain services and functions related to the shipment and the carrier account.

20. The method of claim 1, further comprising:
establishing a shipper account within the CSIST framework based on shipper-provided information;
in response to receiving an entry identifying establishment of a new shipment by the shipper, while the shipper is logged into the shipper account, adding particulars of the shipment to one or more location maps that are presented to one or more carriers;
generating a contract using terms and conditions associated with the particular shipper account and the particular shipment;
presenting terms of the contract for review and acceptance by one or more carriers;
in response to receiving an acceptance by one or more interested carriers, presenting each of the one or more interested carriers that match the carrier terms and requested carrier rating, to the shipper for shipper selection of one of the interested carriers; and
in response to receiving a selection of an interested carrier by the shipper, generating an electronic contract with the shipment terms and forwarding the electronic contract to the selected carrier for review and acceptance via the carrier-view UI.

21. The method of claim 1, further comprising:
establishing a communication with a tracking device on at least one of the cargo and the equipment, which enables tracking of the cargo while the equipment is in transit to the delivery point;
enabling direct communication between both the portal and the shipper with the carrier via inputs entered into the CSIST framework and a mobile communication (MC) device of the carrier; and
enabling direct communication from the portal to the carrier via the MC device of the carrier.

22. The method of claim 21, further comprising:
monitoring an environment within and surrounding the equipment, road and weather conditions, via one or more sensors; and
evaluating and reporting on one or more condition affecting the shipment based on the monitored environment.

23. A computer program product comprising:
a computer readable storage medium; and
program code for a carrier and shipper interfacing and shipment tracking (CSIST) framework stored on the computer readable storage medium and which is executable by a processor on a computing system having the network interface device (NID) for communicating with remotely-connected user devices utilized by the one or more shippers and the one or more carriers, the processor communicatively coupled to the NID and to the CSIST database, and when executing the program code configures the device to perform the features of claim 3.

24. A system for facilitating shipment of cargo, the system comprising:
at least one storage having stored thereon a plurality of processor-executable carrier and shipper interfacing and shipment tracking (CSIST) modules and CSIST data that collectively provides an CSIST framework;
a network interface mechanism (NIM) that operates to enable communication and data exchange between the system and a plurality of second and third devices of the shipper and/or the carriers that connect to the system via the NIM, wherein the system is a first computer device; and
at least one processor that is communicatively coupled to the NIM and to the at least one storage and which, when executing the plurality of CSIST modules, configures the system to:
generate a first user interface providing a map capable of identifying a cargo pick-up point; and
in response to receiving a request from a carrier of a registered equipment for assignment of a cargo, the request originating from a carrier of an equipment:
prompt for entry by the carrier of a desired starting point of the equipment;
determine whether any shipment is available within a particular radius of the desired starting point;
in response to identifying an available shipment, verify that the carrier is an authorized carrier for assigning the available shipment;
in response to the carrier being verified as an authorized carrier for that shipment, generate a route that originates from the desired starting point of the equipment, and proceeds along a first path to the shipment/cargo pick-up point, a second path to the delivery point, and a third path to the desired end point; and
present the route to the carrier along with a notification that indicates a relative opportunity cost of the shipment based on a total distance of the first path and the third path.

25. The system of claim 24, wherein one of the plurality of CSIST modules configures the system to:
present a series of user prompts with associated input blocks within the UI to receive entry of specific content that identifies at least one of a desired end destination, a date and time of travel, a type of cargo and entry of optional, additional details by the carrier;
identify a pick-up zone around the current location; and
initiate the generation and update of the first UI based on the received entries to the series of prompts, wherein the carrier receives a personalized first user interface based in part on the entries and the current location of the equipment.

26. The system of claim 24, wherein the plurality of CSIST modules configures the system to:
receive login credential information from the carrier at a login portal of a carrier and shipper interfacing and shipment tracking (CSIST) framework hosted on a device having the processor, which is coupled to a network interface device (NID) for communicating with remotely-connected user devices utilized by one or more shippers and one or more equipment carriers, the processor communicatively coupled to an CSIST database;
in response to verifying the login credential information, provide access by the carrier to a carrier-view user interface (UI);
present, within the carrier-view UI, a location of each of the at least one available shipment;
provide, for each available shipment, additional details associated with that shipment including the total number of empty miles and a price being offered by an associated shipper for completion of the shipment, wherein the opportunity cost for each shipment is determined based on both the number of empty miles and the price; and
in response to receiving an input for a list view of the available shipments, the processor presenting a second carrier-view UI listing each of the available shipments along with an associated opportunity cost for each available shipment, wherein a ranked listing of the available shipments can be triggered by one of a user selection or a default setting of the second carrier-view UI.

27. The system of claim 24, wherein the plurality of CSIST modules configures the system to:
identify a rating level of the carrier, wherein each carrier is assigned a rating ranging from a lowest, initial tier rating to a highest tier rating achieved based on certain pre-set criteria and historical performance;
evaluate one or more characteristics of the equipment relative to established equipment requirements for each cargo that is determined to be an available shipment;
filter out from the displayed available shipments any shipments of cargo having an established equipment requirement that cannot be met by the equipment, wherein only cargo whose established equipment requirements are met by the equipment are presented within the carrier-view UI as available shipments, irrespective of a carrier rating; and
present, as available shipments within the carrier-view UI, only shipments falling at or below a current rating level of the carrier, wherein the carrier is unable to view or select shipments intended to be assigned to carriers falling within a higher rating level than the current rating level of carrier.

28. The system of claim 24, wherein the plurality of CSIST modules configures the system to:
    track each shipment completed by the carrier;
    receive inputs corresponding to one or more metrics being measured to determine successful completion of the shipment by the carrier;
    evaluate, based on the received inputs, whether the carrier successfully met all of one or more measured metrics;
    in response to the carrier successfully meeting all of the measured metrics, provide an award that is registered within a carrier profile maintained within the CSIST database;
    identify when a total number of awards earned by the carrier reaches a next award threshold corresponding to attainment of a next rating level; and
    in response to the total number of awards earned reaching the next award threshold, elevate the carrier to a next rating level, wherein the carrier becomes eligible to view additional available shipments that are restricted to being viewable only on carrier-view UIs of carriers within the next rating level, wherein the additional available shipments include higher value shipments.

29. The system of claim 24, wherein the plurality of CSIST modules configures the system to:
    in response to receiving a request from a registered shipper to locate a carrier to transport a shipment, the request being received at the CSIST framework:
        identify whether at least one qualified pairing of carrier and equipment are available from among all qualified carriers and equipments registered with the CSIST framework, wherein the carrier and equipment are available when located within a shipment pick-up zone and are a qualified pairing when the carrier meets a minimum rating level for desired carriers and the carrier's equipment meets the established equipment requirements for the equipment of the cargo being shipped;
        compile shipment details and providing the shipment details for presentation within a carrier UI for each qualified carrier associated with one of the at least one qualified pairing;
        enable bi-directional negotiating of shipping particulars, including pricing, for the shipment between the registered shipper and the qualified carriers;
    in response to completion of the negotiation and an acceptance of negotiated terms between the shipper and a carrier selected by the shipper, generate a contractual agreement for acceptance by the carrier within the carrier-view UI; and
    associate the negotiated terms of the contractual agreement with the shipment and store the negotiated terms and shipment details within a data module of the CSIST framework that is available for future viewing by both the carrier and the shipper.

30. The system of claim 24, wherein the plurality of CSIST modules configures the system to:
    present to each registered shipper a shipper-view UI that maps each in-route, recently completed, and scheduled shipments associated with that registered shipper; and
    in response to pick-up of a shipment by an equipment, track movement of the equipment via received movement data and present a current location of the equipment on the shipper-view UI until completion of the shipment; and
    in response to selection by a shipper of a particular shipment on the shipper-view UI:
        open a secondary window that provides additional details about the particular shipment, from among a description of the cargo, a destination of the shipment, shipping-related date and time information, an identifier and contact information of the carrier, and information about the equipment;
        enable communication with the carrier via the secondary window utilizing the contact information;
        initiate a tracking protocol to dynamically track the equipment of a shipment following pick-up of the cargo at the pick-up point;
        update the shipper UI as the equipment moves with the shipment;
        terminate the tracking protocol following successful completion of the shipment, wherein the processor removes the equipment signal from the shipper-view UI; and
        move the shipment to a completed status within the shipper-view UI.

* * * * *